(12) United States Patent
Lung et al.

(10) Patent No.: US 10,236,793 B2
(45) Date of Patent: Mar. 19, 2019

(54) GRID CONNECTION POWER CONVERSION DEVICE AND OUTPUT CURRENT CONTROL METHOD THEREOF

(71) Applicant: Tabuchi Electric Co., Ltd., Yodogawa-ku, Osaka (JP)

(72) Inventors: Chienru Lung, Osaka (JP); Hideki Hidaka, Osaka (JP)

(73) Assignee: Tabuchi Electric Co., Ltd., Osaka (JP)

( * ) Notice: Subject to any disclaimer, the term of this patent is extended or adjusted under 35 U.S.C. 154(b) by 33 days.

(21) Appl. No.: 15/612,047

(22) Filed: Jun. 2, 2017

(65) Prior Publication Data

US 2018/0006580 A1 Jan. 4, 2018

(30) Foreign Application Priority Data

Jun. 30, 2016 (JP) ................................. 2016-130337

(51) Int. Cl.
| | |
|---|---|
| H02M 7/539 | (2006.01) |
| H02M 7/5395 | (2006.01) |
| H02M 5/04 | (2006.01) |
| G05F 1/67 | (2006.01) |
| G05F 1/70 | (2006.01) |
| H02J 3/38 | (2006.01) |

(52) U.S. Cl.
CPC ............ *H02M 7/5395* (2013.01); *G05F 1/67* (2013.01); *G05F 1/70* (2013.01); *H02J 3/385* (2013.01); *H02M 5/04* (2013.01); *H02J 3/38* (2013.01); *H02J 2003/388* (2013.01)

(58) Field of Classification Search
None
See application file for complete search history.

(56) References Cited

U.S. PATENT DOCUMENTS 9,413,224 B2  8/2016 Kouno et al.

FOREIGN PATENT DOCUMENTS

| JP | 2013-85364 A | 5/2013 |
|---|---|---|
| JP | 2015-146712 A | 8/2015 |
| JP | 2015-192562 A | 11/2015 |
| JP | 2016-10203 A | 1/2016 |

OTHER PUBLICATIONS

"Grid-interconnection Code—JEAC 9701—2012," Japan Electrotechnical Standards and Codes Committee (JESC) E 0019 (2012), The Japan Electric Association (Seven (7) pages).

*Primary Examiner* — Adolf Berhane
*Assistant Examiner* — Henry Lee, III
(74) *Attorney, Agent, or Firm* — Crowell & Moring LLP

(57) ABSTRACT

A grid connection power conversion device for connecting a distributed power supply to a three-phase commercial power system is provided. The power conversion device comprises an inverter, an instantaneous voltage detection circuitry to detect a maximum three-phase instantaneous voltage value of the commercial power system, a line voltage detection circuitry to detect a maximum value of each of three line voltages, an instantaneous voltage drop detection circuitry to detect an instantaneous voltage drop, and an output current control circuitry to control an output current value from the inverter. When the instantaneous voltage drop detection circuitry detects an instantaneous voltage drop, the output current control circuitry reduces the output current value from the inverter to an output current value corresponding to a minimum value among the four maximum voltage values which are the maximum three-phase instantaneous voltage value and the maximum values of the three line voltages.

14 Claims, 14 Drawing Sheets

FIG. 7

| PARAMETER | SET VALUE | PARAMETER | SET VALUE |
|---|---|---|---|
| $V^*_{dc}$ | 380 V | $C_{inv}$ | 10 $\mu$F |
| $C_{dc}$ | 6700 $\mu$F | $R_c$ | 3.35 m$\Omega$ |
| $f_{Grid}$ | 60 Hz | $T_d$ | 2 $\mu$s |
| $L_{inv}$ | 470 $\mu$H | $L_{Grid}$ | 0.225 mH |
| $E_{cst}$ | 5 V | $R_{inv}$ | 8 m$\Omega$ |
| $E_{FRT.cst}$ | 170 V | $R_{Grid}$ | 0.19 $\Omega$ |
| SWITCHING FREQUENCY | 10.5 kHz | $\Delta E_{FRT}$ | 10 V |
| SAMPLING FREQUENCY | 21 kHz | $I_{lim}$ | 60A |

FIG. 8

| CONDITION | $e_u$ [V] | $e_v$ [V] | $e_w$ [V] | TYPE OF CONNECTION |
|---|---|---|---|---|
| ① | 202 → 170 | 202 → 170 | 202 → 170 | $\Delta$ |
| ② | 202 → 41 | 202 → 41 | 202 → 41 | $\Delta$ |
| ③ | 202 → 106.78 | 202 → 202 | 202 → 106.78 | $\Delta$ |
| ④ | 182 → 132 | 202 → 102 | 222 → 72 | $\Delta$ |
| ⑤ | 182 → 182 | 202 → 0 | 222 → 222 | $\Delta$ |
| ⑥ | 182 → 0 | 202 → 0 | 222 → 222 | $\Delta$ | ically
GRID CONNECTION POWER CONVERSION DEVICE AND OUTPUT CURRENT CONTROL METHOD THEREOF

CROSS-REFERENCE TO RELATED APPLICATION

This application is based on and claims the benefit of priority of the prior Japanese Patent Application No. 2016-130337, filed on Jun. 30, 2016, the entire contents of which are incorporated herein by reference.

BACKGROUND OF THE INVENTION

1. Field of the Invention

The present invention relates to a grid connection power conversion device (that is, power conversion device for grid connection) for connecting a distributed power supply to a three-phase commercial power system (grid), and also relates to an output current control method of the power conversion device, and more specifically to a technology for continuous operation of the grid connection power conversion device when a fault occurs in the power system.

2. Description of the Related Art

In recent years, it has become common for a distributed power supply such as a solar cell to be connected to a commercial power system (grid), and in the future, it is expected that many distributed power supplies will be connected to the commercial power system. In such a situation, if a significant change occurs in the system (grid) voltage or the system frequency due to a transient change (such as an instantaneous voltage drop) when a fault occurs in the power system, there is a risk that the distributed power supplies may be disconnected from the power system at the same time due to an islanding operation prevention function of each grid connection power conversion device (for example, power conditioner), causing a significant influence on the voltage or frequency of the commercial power system.

Thus, in order to secure the power quality of the commercial power system at the time of a power system fault, the grid connection power conversion device for the distributed power supply is required in Japan to have a continuous operation performance (to comply with the Fault Ride Through (FRT) requirement) at the time of the power system fault (refer to "Grid-interconnection Code JEAC (Japan Electric Association Code) 9701-2012"). Note that the islanding operation prevention function described above is a function to disconnect the individual distributed power supplies from the commercial power system when, for example, a power outage occurs in the commercial power system.

This kind of power conversion device detects a phase angle of the system voltage and, based on the detected phase angle, generates an AC power matching the commercial power system. However, it cannot accurately detect the phase angle of the system voltage when a low voltage fault such as an instantaneous voltage drop occurs in the system voltage. In such a state where the power conversion device cannot accurately detect the phase angle of the system voltage, a resonant current of non-fundamental order is continuously generated due to a relationship between the power conversion device, which operates based on the unstable phase angle, and reactors (inductors and capacitors) in the power system. In particular, when many distributed power supplies are connected to the power system, the resonant current in the power system becomes large, which causes shutdown of load equipment of users due to a voltage drop (so-called load drop), which in turn causes an increase in the resonance phenomenon, and therefore there is a possibility that many distributed power supplies may be disconnected from the power system at the same time.

Conventionally, in order to achieve the required continuous operation performance (FRT requirement) in the state where the power conversion device cannot accurately detect the phase angle of the system voltage, a control method is often used which continuously outputs an output current up to its upper limit value. However, if many distributed power supplies are connected to the same commercial power system, there is a risk that an upstream (higher voltage) power system (grid) may become unstable through the system impedance when output currents from many power conversion devices are output to their upper limit values during an instantaneous voltage drop.

Thus, as an example of this kind of power conversion device, a power conditioner is known as described in Japanese Laid-open Patent Publications 2013-085364 and 2015-146712. In this power conditioner, when there is a transient change in the system voltage such as an instantaneous voltage drop, the phase angle used to calculate a command value for an output current from an inverter is switched from a phase angle obtained (detected) then to a phase angle in cycles (for example, 3 cycles) before then, which has been stored in a phase storage, so as to suppress a change in the output current from the inverter when an instantaneous voltage drop occurs in the system voltage.

Further, in this kind of power conversion device, as described in Japanese Laid-open Patent Publication 2015-192562, it is known to temporarily stop the operation of each switching element of an inverter when an overcurrent occurs in an output current from the inverter due to an instantaneous voltage drop, and to restart the operation of each switching element when the output current from the inverter returns to a proper value. This can restart the operation of each switching element in a shorter time as compared with performing a gate block based on information of the system voltage, making it possible to suppress a decrease in the output of the inverter in continuing the operation of the power conversion device when an instantaneous voltage drop occurs in the system voltage.

Further, Japanese Laid-open Patent Publication 2016-010203 discloses a control method of a power conversion device in which when an instantaneous voltage drop in the power system is detected, the upper limit value of the output current from the inverter is set (changed) to an immediately pre-drop output current value, which is an output current value from the inverter immediately before the instantaneous voltage drop occurs, so as to prevent an overcurrent of the output current from the inverter immediately after voltage recovery of the power system from the instantaneous voltage drop. When a predetermined period of time elapses after the voltage recovery of the power system, this control method of the power conversion device sets (changes) the upper limit value of the output current from the inverter to a rated output current value from the inverter or a value a little higher than the rated output current value.

However, these power conversion devices have the following problems. In the power conversion devices (power conditioners) described in Japanese Laid-open Patent Publication 2013-085364 and 2015-146712 above, there is a possibility that a distortion may occur in the output current from the inverter, causing an overcurrent, because the phase angle used to calculate a command value for an output current from the inverter is instantaneously switched between a phase angle obtained then and a stored phase angle, when an instantaneous voltage drop occurs and when the power system recovers from the instantaneous voltage drop.

Further, in the power conversion device as described in Japanese Laid-open Patent Publication 2015-192562 above, the operation of each switching element of an inverter is stopped when an overcurrent occurs in an output current from the inverter due to an instantaneous voltage drop, resulting in stoppage of the output current from the inverter, and therefore the continuous operation of the power conversion device in its true meaning is not possible when an instantaneous voltage drop occurs. Particularly, in the power conversion device described in Embodiment 5 of Japanese Laid-open Patent Publication 2015-192562, a control method is used when an instantaneous voltage drop occurs in the system voltage. This control method performs a d-q axis coordinate conversion or transformation (conversion to the d-q axis coordinate) on detected values of a three-phase system voltage, and allows the phase angle of the output voltage from the inverter to synchronize with the phase angle of the system voltage. Therefore, when an instantaneous voltage drop occurs in the system voltage due to a two-phase short circuit, the phase angle of the system voltage is lost (that is, it becomes impossible to detect the phase angle), and thus the continuous operation of the power conversion device becomes impossible.

Further, in the control method of the power conversion device as described in Japanese Laid-open Patent Publication 2016-010203 above, when many distributed power supplies are connected to the same commercial power system, an instantaneous voltage drop causes each of many power conversion devices using this control method to output a current up to an immediately pre-drop output current value during the instantaneous voltage drop. Here, there is a possibility that the output current from the inverter may already be distorted during the instantaneous voltage drop, and therefore an upstream power system may become unstable through the system impedance if the many power conversion devices continue to output currents up to their immediately pre-drop output current values during the instantaneous voltage drop.

Generally, a conventional control method of a grid connection power conversion device to connect a distributed power supply to a three-phase commercial power system (hereafter referred to as "three-phase system") obtains the amplitude of the system voltage, the active power, the reactive power and so on, on the premise that the three-phase system voltage is balanced (that is, the amplitudes of the respective voltages of the three-phase system are the same), so as to control the output power. However, in reality, the three-phase system voltage is not perfectly balanced, and therefore, in the above-described control method of the grid connection power conversion device to connect to the three-phase system, it is necessary to consider control for when the three-phase system voltage is unbalanced.

BRIEF SUMMARY OF THE INVENTION

An object of the present invention is to solve the problems described above, and to provide a grid connection power conversion device and an output current control method of the power conversion device which can limit or suppress an output current from an inverter so as to perform a stable continuous operation when an instantaneous voltage drop occurs in a commercial three-phase power system, regardless of whether the three-phase system voltage is balanced or unbalanced.

According to a first aspect of the present invention, this object is achieved by a grid connection power conversion device for connecting a distributed power supply to a three-phase commercial power system, the grid connection power conversion device comprising: an inverter for converting DC power based on power input from the distributed power supply to three-phase AC power; an instantaneous voltage detection circuitry configured to detect a maximum three-phase instantaneous voltage value of the commercial power system; a line voltage detection circuitry configured to detect a maximum value of each of three line voltages of three-phase AC voltage of the commercial power system; an instantaneous voltage drop detection circuitry configured to detect an instantaneous voltage drop in the commercial power system; and an output current control circuitry configured to control an output current value from the inverter.

When the instantaneous voltage drop detection circuitry detects an instantaneous voltage drop, the output current control circuitry reduces the output current value from the inverter to an output current value corresponding to a minimum value among four maximum voltage values which are the maximum three-phase instantaneous voltage value detected by the instantaneous voltage detection circuitry and the maximum values of the three line voltages detected by the line voltage detection circuitry.

According to the grid connection power conversion device of the first aspect of the present invention, when an instantaneous voltage drop occurs in the commercial power system, the output current value from the inverter can be reduced to an output current value corresponding to a minimum value among the four maximum voltage values, which are the detected maximum three-phase instantaneous voltage value and the detected three maximum values of the three line voltages. Thus, the output current from the inverter can be suppressed to prevent the occurrence of an overcurrent, making it possible to perform a stable continuous operation of the power conversion device, when the instantaneous voltage drop occurs in the commercial power system, regardless of whether the three-phase system voltage is balanced or unbalanced. Further, there is no risk that an upstream power system may become unstable, since the output current from the inverter is suppressed (reduced or limited) when the instantaneous voltage drop is detected.

It is preferred that the grid connection power conversion device further comprises: a three-phase to two-phase AC voltage conversion circuitry configured to convert the three-phase AC voltage of the commercial power system to two-phase AC voltage of $\alpha$-phase and $\beta$-phase, wherein the instantaneous voltage detection circuitry obtains the maximum three-phase instantaneous voltage value based on the two-phase AC voltage of the $\alpha$-phase and the $\beta$-phase obtained by conversion by the three-phase to two-phase AC voltage conversion circuitry.

It is also preferred that the grid connection power conversion device further comprises: an active power command value output circuitry configured to output a command value for active power to be output from the inverter; a reactive power command value output circuitry configured to output a command value for reactive power to be output from the inverter; and an output current command value calculation circuitry configured to calculate two-phase AC output current command values of the $\alpha$-phase and the $\beta$-phase for two-phase AC current to be output from the inverter based on the active power command value output from the active power command value output circuitry, the reactive power command value output from the reactive power command value output circuitry, and the two-phase AC voltage of the α-phase and the β-phase obtained by conversion by the three-phase to two-phase AC voltage conversion circuitry, wherein the output current control circuitry controls the output current value from the inverter based on the two-phase AC output current command values of the α-phase and the β-phase calculated by the output current command value calculation circuitry.

It is also preferred in the grid connection power conversion device that the line voltage detection circuitry calculates an effective value of each of the three line voltages of the commercial power system for one half period of voltage waveform of the commercial power system, and calculates the maximum values of the three line voltages by multiplying an effective value of each of the three line voltages by the square root of 2.

It is also preferred in the grid connection power conversion device that when the three-phase AC voltage of the commercial power system is unbalanced, the output current control circuitry limits the output current value from the inverter to a predetermined upper limit value during the one half period of the voltage waveform from when the instantaneous voltage drop occurs, and reduces the output current value from the inverter to an output current value corresponding to the minimum value among the four maximum voltage values when the instantaneous voltage drop detection circuitry detects the instantaneous voltage drop.

It is also preferred in the grid connection power conversion device that when the instantaneous voltage drop detection circuitry detects the instantaneous voltage drop, and when the minimum value among the four maximum voltage values is lower than a preset line voltage lower limit value, the output current control circuitry reduces the output current value from the inverter to an output current value corresponding to the line voltage lower limit value.

It is also preferred in the grid connection power conversion device that the instantaneous voltage drop detection circuitry detects that the instantaneous voltage drop has occurred when the minimum value among the four maximum voltage values becomes equal to or lower than a predetermined threshold, wherein the instantaneous voltage drop detection circuitry detects that the voltage of the commercial power system has recovered to a normal voltage value when the minimum value among the four maximum voltage values changes from a value equal to or lower than the threshold to a value higher than the threshold by equal to or more than a predetermined value.

It is also preferred in the grid connection power conversion device that the inverter comprises switching elements which are switched by Third Harmonic Injected Pulse Width Modulation method.

In the grid connection power conversion device, the three phases of the power supply of the commercial power system can be Δ-connected or Y-connected.

It is also possible that the grid connection power conversion device further comprises: a line voltage measurement circuitry configured to measure two instantaneous line voltages among three instantaneous line voltages of the commercial power system; and a line voltage calculation circuitry configured to calculate the other instantaneous line voltage among the three instantaneous line voltages based on the two instantaneous line voltages measured by the line voltage measurement circuitry, wherein the line voltage detection circuitry obtains the maximum values of the three line voltages based on the two instantaneous line voltages measured by the line voltage measurement circuitry and the other instantaneous line voltage calculated by the line voltage calculation circuitry.

According to a second aspect of the present invention, the above object is achieved by a grid connection power conversion device for connecting a distributed power supply to a three-phase commercial power system, the grid connection power conversion device comprising: an inverter for converting DC power based on power input from the distributed power supply to three-phase AC power; a line voltage detection circuitry configured to detect a maximum value of each of three line voltages of three-phase AC voltage of the commercial power system; an instantaneous voltage drop detection circuitry configured to detect an instantaneous voltage drop in the commercial power system; and an output current control circuitry configured to control an output current value from the inverter.

When the instantaneous voltage drop detection circuitry detects an instantaneous voltage drop in the commercial power system, and when a minimum value among the maximum values of the three line voltages detected by the line voltage detection circuitry is equal to or higher than a preset line voltage lower limit value, the output current control circuitry reduces the output current value from the inverter to an output current value corresponding to the minimum value among the maximum values of the three line voltages.

When the instantaneous voltage drop detection circuitry detects an instantaneous voltage drop in the commercial power system, and when a minimum value among the maximum values of the three line voltages detected by the line voltage detection circuitry is lower than the line voltage lower limit value, the output current control circuitry reduces the output current value from the inverter to an output current value corresponding to the line voltage lower limit value.

According to the grid connection power conversion device of the second aspect of the present invention, when an instantaneous voltage drop occurs in the commercial power system, and when a minimum value among the maximum values of the three line voltages is equal to or higher than the preset line voltage lower limit value, the output current from the inverter can be reduced to an output current value corresponding to the minimum value among the maximum values of the three line voltages. On the other hand, when an instantaneous voltage drop occurs in the commercial power system, and when a minimum value among the maximum values of the three line voltages is lower than the line voltage lower limit value, the output current from the inverter can be reduced to an output current value corresponding to the line voltage lower limit value. Thus, the output current from the inverter can be suppressed to prevent the occurrence of an overcurrent, making it possible to perform a stable continuous operation of the power conversion device, when the instantaneous voltage drop occurs in the commercial power system, regardless of whether the three-phase system voltage is balanced or unbalanced. Further, there is no risk that an upstream power system may become unstable, since the output current from the inverter is suppressed (reduced or limited) when the instantaneous voltage drop is detected.

According to a third aspect of the present invention, the above object is achieved by a grid connection power conversion device for connecting a distributed power supply to a three-phase commercial power system, the grid connection power conversion device comprising: an inverter for converting DC power based on power input from the distributed power supply to three-phase AC power; a phase voltage detection circuitry configured to detect a maximum value of each of three phase voltages of three-phase AC voltage of the commercial power system; an instantaneous voltage drop detection circuitry configured to detect an instantaneous voltage drop in the commercial power system; and an output current control circuitry configured to control an output current value from the inverter.

When the instantaneous voltage drop detection circuitry detects an instantaneous voltage drop in the commercial power system, and when a minimum value among the maximum values of the three phase voltages detected by the phase voltage detection circuitry is equal to or higher than a preset phase voltage lower limit value, the output current control circuitry reduces the output current value from the inverter to an output current value corresponding to the minimum value among the maximum values of the three line voltages.

When the instantaneous voltage drop detection circuitry detects an instantaneous voltage drop in the commercial power system, and when a minimum value among the maximum values of the three phase voltages detected by the phase voltage detection circuitry is lower than the phase voltage lower limit value, the output current control circuitry reduces the output current value from the inverter to an output current value corresponding to the phase voltage lower limit value.

According to the grid connection power conversion device of the third aspect of the present invention, when an instantaneous voltage drop occurs in the commercial power system, and when a minimum value among the maximum values of the three phase voltages is equal to or higher than the preset phase voltage lower limit value, the output current value from the inverter can be reduced to an output current value corresponding to the minimum value among the maximum values of the three phase voltages. On the other hand, when an instantaneous voltage drop occurs in the commercial power system, and when a minimum value among the maximum values of the three phase voltages is lower than the phase voltage lower limit value, the output current from the inverter can be reduced to an output current value corresponding to the phase voltage lower limit value. Thus, the output current from the inverter can be suppressed to prevent the occurrence of an overcurrent, making it possible to perform a stable continuous operation of the power conversion device, when the instantaneous voltage drop occurs in the commercial power system, regardless of whether the three-phase system voltage is balanced or unbalanced. Further, there is no risk that an upstream power system may become unstable, since the output current from the inverter is suppressed (reduced or limited) when the instantaneous voltage drop is detected.

According to a fourth aspect of the present invention, the above object is achieved by an output current control method of a grid connection power conversion device comprising an inverter for converting DC power based on power input from a distributed power supply to three-phase AC power, the output current control method comprising the steps of: detecting a maximum three-phase instantaneous voltage value of a commercial power system; detecting maximum values of three line voltages of the commercial power system; detecting an instantaneous voltage drop in the commercial power system; and reducing an output current value from the inverter to an output current value corresponding to a minimum value among the four maximum voltage values, which are the maximum three-phase instantaneous voltage value and the maximum values of the three line voltages, when the instantaneous voltage drop has been detected.

This output current control method of the grid connection power conversion device according to the fourth aspect of the present invention can have effects similar to those of the grid connection power conversion device according to the first aspect of the present invention.

While the novel features of the present invention are set forth in the appended claims, the present invention will be better understood from the following detailed description taken in conjunction with the drawings.

BRIEF DESCRIPTION OF THE DRAWINGS

The present invention will be described hereinafter with reference to the annexed drawings. It is to be noted that the drawings are shown for the purpose of illustrating the technical concepts of the present invention or embodiments thereof, wherein:

FIG. 4A is a schematic view showing waveforms of a carrier signal and an output duty ratio for normal SPWM method, while

FIG. 7 is a table showing values of parameters set in simulations of operation of the power conditioner when an instantaneous voltage drop occurs;

FIG. 8 is a table showing conditions for the simulations of the operation of the power conditioner when the instantaneous voltage drop occurs;

DETAILED DESCRIPTION OF THE INVENTION

Figure 1:
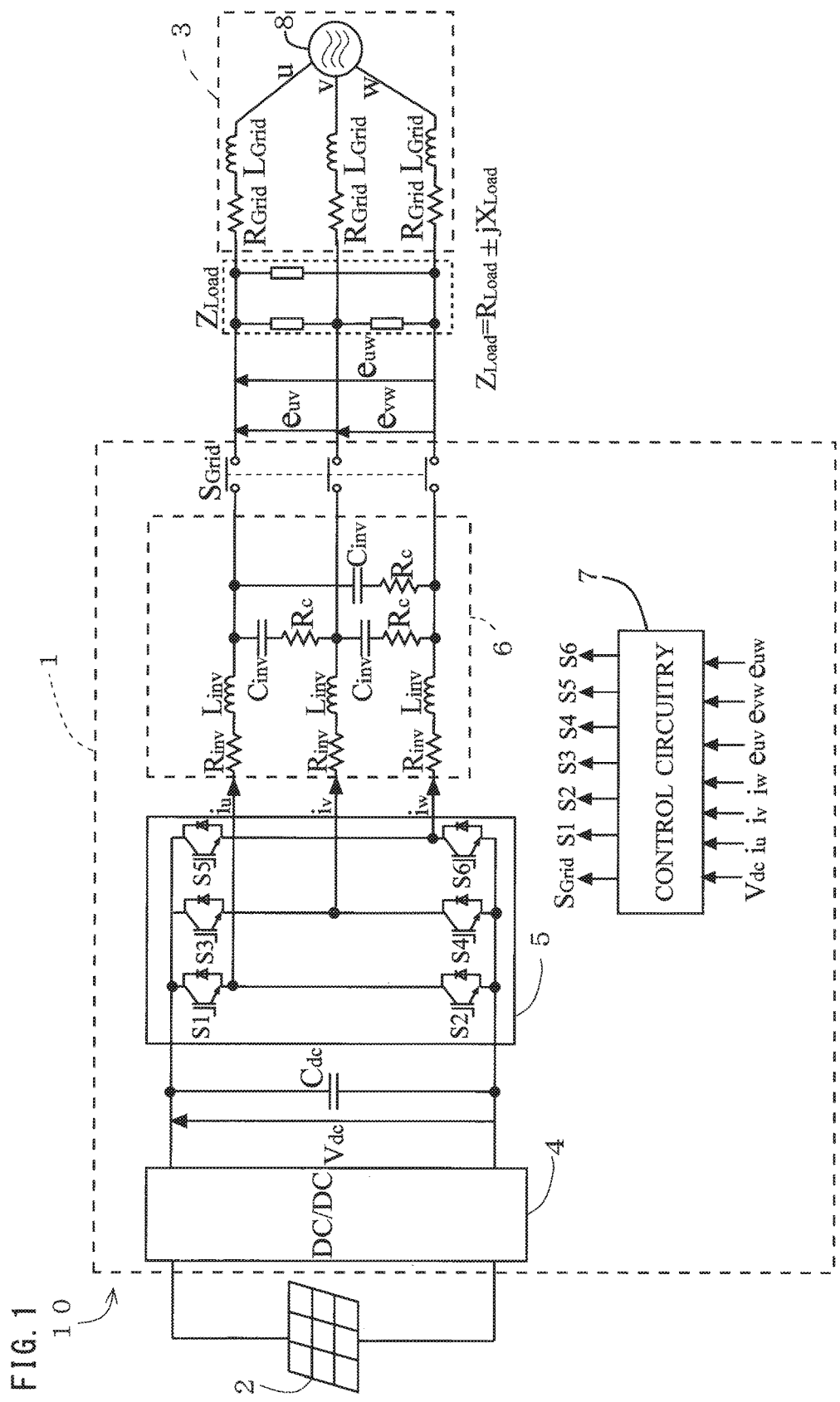
FIG. 1 is a schematic circuit diagram, partially in block form, showing a solar photovoltaic power generation system including a power conditioner (grid connection power conversion device) according to an exemplary embodiment of the present invention.

Hereinafter, a grid connection power conversion device and an output current control method of the grid connection power conversion device according to an exemplary embodiment of the present invention will be described with reference to the drawings. The present exemplary embodiment shows an example where the claimed grid connection power conversion device is a power conditioner for connecting a solar cell to a three-phase commercial power system (grid). FIG. 1 is a schematic circuit diagram, partially in block form, showing a solar photovoltaic power generation system 10 including a power conditioner (grid connection power conversion device) 1 according to the present exemplary embodiment. The solar photovoltaic power generation system 10 comprises a solar cell 2 as a distributed power supply and the power conditioner 1 for converting DC power generated by the solar cell 2 to AC power, and can be connected (grid-connected) to a three phase commercial power system (commercial power grid) (hereafter referred to as "three-phase system") 3. The power conditioner 1 comprises: a DC/DC converter 4; an electrolytic capacitor $C_{dc}$ for smoothing DC bus voltage $V_{dc}$; an inverter 5; an LC (inductor-capacitor) filter 6; a control circuitry 7; and a grid connection relay $S_{Grid}$ (that is, relay for grid connection).

The DC/DC converter 4 performs Maximum Power Point Tracking (hereafter referred to as MPPT) control of the solar cell 2 to adjust an input voltage from the solar cell 2 to maximize (optimize) an output voltage from the solar cell 2. More specifically, the DC/DC converter 4 performs the MPPT control by increasing or decreasing the input voltage from the solar cell 2 to a predetermined input voltage so that the solar cell 2 can output the maximum power. Note, however, that when the inverter 5 limits the output current, it is necessary to switch the control mode of the DC/DC converter 4 from normal MPPT control to CV (Constant Voltage) control, which increases or decreases a DC output voltage (DC bus voltage $V_{dc}$) within a certain range.

The inverter 5 is configured to convert the DC power, which is based on the power input from the solar cell 2 and output to the inverter 5 from the DC/DC converter 4, to three-phase AC power. More specifically, in order to convert all the maximum output power from the DC/DC converter 4 to AC output power and to control for stable output power, the inverter 5 is always required to control the DC bus voltage to be constant. The inverter 5 comprises switching elements S1 to S6 formed by IGBTs (Insulated Gate Bipolar Transistors) which are switched by a PWM (Pulse Width Modulation) signal sent from the control circuitry 7 of the power conditioner 1. In FIG. 1, $i_u$, $i_v$ and $i_w$ represent currents (hereafter referred to as "inverter output currents") output from the inverter 5 to the three-phase power supply lines of the three-phase system 3, respectively, which are the U-phase line, the V-phase line and the W-phase line, respectively.

On the other hand, the LC filter 6 comprises three inductors (reactors) $L_{inv}$ connected in series with the three-phase power supply lines, respectively, and three capacitors $C_{inv}$ connected between the U-V phase lines, between the V-W phase lines, and between the U-W phase lines, respectively, to remove or cancel harmonic components (mainly the carrier frequency of the PWM signal) from the output currents from the inverter 5. In FIG. 1, $R_{inv}$ and represent an inner resistance of each inductor $L_{inv}$ and an inner resistance of each capacitor $C_{inv}$, respectively. The control circuitry 7 is formed by a so-called microcomputer to mainly control the DC/DC converter 4 and the inverter 5. The grid connection relay $S_{Grid}$ serves as a switch for switching the connection of the solar cell 2 (and the power conditioner 1) to the three-phase system 3 between a connected state and a disconnected state.

The three-phase system 3 includes a commercial system power supply 8 and a system (grid) impedance. In FIG. 1, $R_{Grid}$ and $L_{Grid}$ represent a resistance and an inductance (inductive reactance) of the system impedance, respectively, while $Z_{Load}$ represents a three-phase load connected to the three-phase system 3. The three-phase load $Z_{Load}$ includes a resistive component ($R_{Load}$) and a reactive component ($\pm jX_{Load}$). In FIG. 1, $e_{uv}$, $e_{vw}$ and $e_{uw}$ represent line voltages (line-to-line voltages), which are respectively measured system voltages, between the U-V phase lines, between the V-W phase lines, and between the U-W phase lines, respectively, of the three-phase power supply lines. In FIG. 1, the input signals to the control circuitry 7 (which are measured) are the DC bus voltage $V_{dc}$, the output currents $i_u$, $i_v$, $i_w$ from the inverter 5, and the line voltages $e_{uv}$, $e_{vw}$, $e_{uw}$ between the respective two phase lines of the power supply lines. Further in FIG. 1, the output signals from the control circuitry 7 are an output signal to control the grid connection relay $S_{Grid}$, and output signals to control the switching elements S1 to S6 of the inverter 5.

Figure 2:
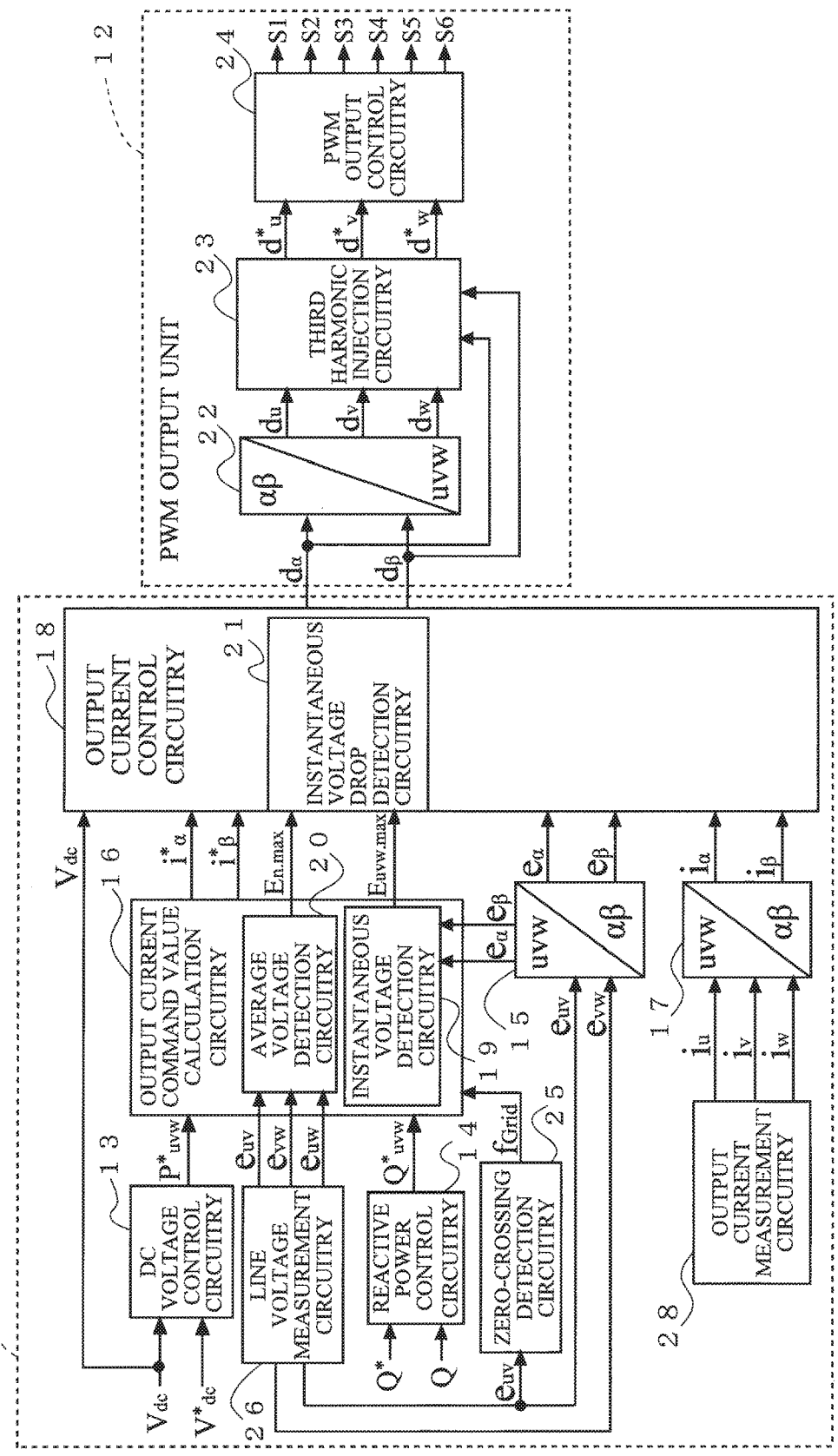
FIG. 2 is a schematic block diagram showing a control circuitry of the power conditioner.

FIG. 2 is a schematic block diagram showing the control circuitry 7 of the power conditioner 1. FIG. 2 shows a grid-connected operation control unit 11 and a PWM output unit 12. Each circuitry in FIG. 2 is formed by a basic function block of the microcomputer. The control circuitry 7 of the power conditioner 1 controls the DC bus voltage $V_{dc}$ to be constant, and also controls reactive power and the output currents from the inverter 5. As shown in FIG. 2, the grid-connected operation control unit 11 comprises a DC voltage control circuitry 13, a reactive power control circuitry 14, a three-phase to two-phase AC voltage conversion circuitry (uvw/αβ) 15, an output current command value calculation circuitry 16, a three-phase to two-phase AC current conversion circuitry (uvw/αβ) 17, an output current control circuitry 18, a zero-crossing detection circuitry 25, a line voltage measurement circuitry 26 and an output current measurement circuitry 28. The DC voltage control circuitry 13 and the reactive power control circuitry 14 correspond to the claimed active power command value output circuitry and reactive power command value output circuitry, respectively.

The DC voltage control circuitry 13 is configured to control so that the DC bus voltage $V_{dc}$ input from the DC/DC converter 4 is constant. Based on a difference between a value of the DC bus voltage $V_{dc}$, which is an input voltage to the inverter 5, and a DC bus voltage command value $V^*_{dc}$, which is a command value for the DC bus voltage $V_{dc}$, the DC voltage control circuitry 13 outputs a command value for active power to be output from the inverter 5. More specifically, from the input DC bus voltage command value $V^*_{dc}$ and a measured value of the DC bus voltage $V_{dc}$, the DC voltage control circuitry 13 calculates (obtains) an active power command value $P^*_{uvw}$ which is required to control the DC bus voltage to be constant, and inputs the active power command value $P^*_{uvw}$ to the output current command value calculation circuitry 16.

Further, based on a difference between a feedback value Q of reactive power output from the inverter 5 and a reactive power target value $Q^*$, which is a control target value of reactive power to be output from the inverter 5, the reactive power control circuitry 14 outputs a command value for reactive power to be output from the inverter 5. More specifically, from the input reactive power target value $Q^*$ and the feedback value Q of reactive power, the reactive power control circuitry 14 calculates (obtains) a reactive power command value $Q^*_{uvw}$, and inputs the reactive power command value $Q^*_{uvw}$ to the output current command value calculation circuitry 16. Note that Equations (1) to (11) described below are used for various value calculations and conversions. Also note that when the three-phase system voltage (more specifically, the three-phase AC voltage of the three-phase system) is unbalanced, a feedback value P of active power (instantaneous active power) and a feedback value Q of reactive power (instantaneous reactive power) calculated from Equations (9) and (10), respectively, contain a 2f component (that is, a frequency component twice the fundamental frequency). In the present exemplary embodiment, in view of the stability of the reactive power control circuitry 14, it is desirable to use a low-pass filter to remove this 2f component.

The line voltage measurement circuitry 26 measures instantaneous line voltages $e_{uv}$, $e_{vw}$ and $e_{uw}$ (three-phase AC voltage) of the three-phase system 3, and outputs A/D (Analog/Digital) converted instantaneous line voltages $e_{uv}$, $e_{vw}$ and $e_{uw}$. The three-phase to two-phase AC voltage conversion circuitry 15 is configured to convert the instantaneous line voltages $e_{uv}$, $e_{vw}$ measured by the line voltage measurement circuitry 26 to an α-phase instantaneous AC voltage $e_\alpha$ and a β-phase instantaneous AC voltage $e_\beta$ (which can be described as two-phase AC voltage of α-phase and β-phase obtained by conversion by the three-phase to two-phase AC voltage conversion circuitry 15, and can also be described as values obtained by converting the instantaneous line voltages $e_{uv}$, $e_{vw}$ to the α-β axis coordinate), by using the following Equation (5). The output current command value calculation circuitry 16 comprises an instantaneous voltage detection circuitry 19 and an average voltage detection circuitry 20 (claimed line voltage detection circuitry).

$$\begin{bmatrix} i_\alpha^* \\ i_\beta^* \end{bmatrix} = \frac{2}{3 \cdot E_{max}^2} \cdot \begin{bmatrix} e_\alpha & e_\beta \\ e_\beta & -e_\alpha \end{bmatrix} \cdot \begin{bmatrix} P_{uvw}^* \\ Q_{uvw}^* \end{bmatrix} \quad (1)$$

$$E_{uvw \cdot max} = \sqrt{3 \cdot (e_\alpha^2 + e_\beta^2)} \quad (2)$$

$$E_{max} = \max\{E_{uvw \cdot max}, E_{n \cdot max}\} \quad (3)$$

$$E_{n \cdot max} = \sqrt{\frac{4}{T_{Grid \cdot avg}} \cdot \int_0^{\frac{T_{Grid \cdot avg}}{2}} e_n^2(t) dt}, \quad n = uv, vw, uw \quad (4)$$

$$\begin{bmatrix} e_\alpha \\ e_\beta \end{bmatrix} = \frac{1}{3} \cdot \begin{bmatrix} 2 & 1 \\ 0 & \sqrt{3} \end{bmatrix} \cdot \begin{bmatrix} e_{uv} \\ e_{vw} \end{bmatrix} \quad (5)$$

$$\begin{bmatrix} i_\alpha \\ i_\beta \end{bmatrix} = \frac{2}{3} \cdot \begin{bmatrix} 1 & -\frac{1}{2} & -\frac{1}{2} \\ 0 & \frac{\sqrt{3}}{2} & -\frac{\sqrt{3}}{2} \end{bmatrix} \cdot \begin{bmatrix} i_u \\ i_v \\ i_w \end{bmatrix} \quad (6)$$

$$\begin{bmatrix} d_u \\ d_v \\ d_w \end{bmatrix} = \begin{bmatrix} 1 & 0 \\ -\frac{1}{2} & \frac{\sqrt{3}}{2} \\ -\frac{1}{2} & -\frac{\sqrt{3}}{2} \end{bmatrix} \cdot \begin{bmatrix} d_\alpha \\ d_\beta \end{bmatrix} \quad (7)$$

$$\begin{bmatrix} d_u^* \\ d_v^* \\ d_w^* \end{bmatrix} = \frac{3}{2} \cdot \begin{bmatrix} d_u \\ d_v \\ d_w \end{bmatrix} - \frac{2}{3 \cdot (d_\alpha^2 + d_\beta^2)} \cdot \begin{bmatrix} d_u^3 \\ d_v^3 \\ d_w^3 \end{bmatrix} \quad (8)$$

$$P = \frac{3}{2} \cdot [e_\alpha i_\alpha + e_\beta i_\beta] \quad (9)$$

$$Q = \frac{3}{2} \cdot [-e_\alpha i_\beta + e_\beta i_\alpha] \quad (10)$$

$$\begin{cases} f_{Grid \cdot avg} = \frac{1}{y+1} \cdot \sum_{n=0}^{y} f_{Grid} \ (z-n) \\ T_{Grid \cdot avg} = \frac{1}{f_{Grid \cdot avg}} \end{cases} \quad (11)$$

The instantaneous voltage detection circuitry 19 detects a maximum instantaneous voltage value of the three-phase AC voltage of the three-phase system 3. More specifically, as shown in Equation (2) above, the instantaneous voltage detection circuitry 19 multiplies the square root of the sum of the square of the α-phase instantaneous AC voltage $e_\alpha$ and the square of the β-phase instantaneous AC voltage $e_\beta$, as obtained by the three-phase to two-phase AC voltage conversion circuitry 15, by the square root of 3 to obtain a maximum three-phase instantaneous voltage value $E_{uvw.max}$ of the three-phase AC voltage of the three-phase system 3. On the other hand, the average voltage detection circuitry 20 is configured to detect a maximum value of each of the three line voltages of the three-phase AC voltage of the three-phase system 3. More specifically, based on the instantaneous line voltages $e_{uv}(t)$, $e_{vw}(t)$ and $e_{uw}(t)$ output from the line voltage measurement circuitry 26 and by using Equation (4) above, the average voltage detection circuitry 20 calculates amplitudes (maximum values) $E_{uv.max}$, $E_{vw.max}$, $E_{uw.max}$ of the respective three line voltages by multiplying an effective value of each line voltage by the square root of 2. In Equation (4), $T_{Grid,avg}$ represents an average period of each line voltage of the three-phase system 3. The average voltage detection circuitry 20 is configured to calculate the effective value of each of the line voltages $e_{uv}$, $e_{vw}$, $E_{uw}$ for one half period (half cycle) (that is, $T_{Grid.avg}/2$) of voltage waveform of the three-phase system 3.

The zero-crossing detection circuitry 25 is configured to measure a commercial system frequency $f_{Grid}$ based on zero-crossing timing of the instantaneous line voltage $e_{uv}(t)$ measured by the line voltage measurement circuitry 26, and includes a voltage dividing circuitry configured to divide an AC voltage and a binarization circuitry configured to binarize a divided AC voltage signal. On the other hand, the output current command value calculation circuitry 16 is configured to calculate the average period $T_{Grid.avg}$ by substituting the commercial system frequencies $f_{Grid}$ measured by the zero-crossing detection circuitry 25 into Equation (11) above, and sends this average period $T_{Grid,avg}$ to the average voltage detection circuitry 20. Here, there are two reasons for the use of the zero-crossing detection circuitry 25. One reason is to accurately measure the commercial system frequency $f_{Grid}$. The other reason is to detect a change in the frequency measured by the zero-crossing detection circuitry 25 so as to quickly detect an islanding operation when the islanding operation occurs in the solar photovoltaic power generation system 10.

Note that in Equation (11) above, z represents a z-th sampling period (one period), while (y+1) represents the number of sampling to calculate the average period $T_{Grid.avg}$. It is considered that as the number (y+1) of sampling to calculate the average period $T_{Grid.avg}$ increases, the influence of a change in the system frequency due to an instantaneous voltage drop is reduced. Assuming that a two-phase short circuit fault between the U-phase and the V-phase occurs, the line voltage $e_{uv}$ becomes zero, making it impossible for the zero-crossing detection circuitry 25 to measure the system frequency. However, it is considered that even in this case, the influence of the two-phase short circuit fault on the average period $T_{Grid.avg}$ is reduced by increasing the number (y+1) of sampling, making it possible to accurately obtain each maximum line voltage value.

Next, a process performed by the output current command value calculation circuitry 16 will be described. First, the output current command value calculation circuitry 16 calculates a total maximum system voltage value $E_{max}$ in the three-phase system 3 by using Equation (3) above such that a maximum value among four maximum voltage values, which are the maximum three-phase instantaneous voltage value $E_{uvw.max}$ obtained by the instantaneous voltage detection circuitry 19 and the three maximum values $E_{uv.max}$, $E_{vw.max}$, $E_{uw.max}$ of the three line voltages calculated by the average voltage detection circuitry 20, is determined as the total maximum system voltage value $E_{max}$. Here, the concept used to calculate the total maximum system voltage value $E_{max}$ is based on that total maximum system voltage value $E_{max}=E_{uvw.max}=E_{n.max}$ when the three-phase system voltage is balanced, while total maximum system voltage value $E_{max}=E_{n.max}$ when the the three-phase system voltage is unbalanced. Here, $E_{n.max}$ in Equation (3) represents the maximum values $E_{uv.max}$, $E_{uv.max}$, $E_{uw.max}$ of the respective three line voltages calculated from Equation (4).

Generally, the phase difference between the α-phase instantaneous AC voltage $e_\alpha$ and the β-phase instantaneous AC voltage $e_\beta$ is always 90°. When the three-phase system voltage is balanced, it is considered that the α-phase instantaneous AC voltage $e_\alpha$ and the β-phase instantaneous AC voltage $e_\beta$ have the same amplitude value, and the maximum instantaneous voltage value $E_{uvw.max}$ calculated from Equation (2) above is constant. However, when the three-phase system voltage is unbalanced, it is considered that the α-phase instantaneous AC voltage $e_\alpha$ and the β-phase instantaneous AC voltage $e_\beta$ have different amplitude values, and the maximum instantaneous voltage value $E_{uvw.max}$ calculated from Equation (2) above contains a 2f component. Then (when the three-phase system voltage is unbalanced), the total maximum system voltage value $E_{max}$ is calculated by using Equation (3) above, in order to prevent the total maximum system voltage value $E_{max}$ from being a maximum instantaneous voltage value $E_{uvw.max}$ containing a 2f component.

Then the output current command value calculation circuitry 16 calculates two-phase AC output current command values $i^*_\alpha$, $i^*_\beta$ (of α-phase and β-phase) for two-phase AC current to be output from the inverter 5 based on the active power command value $P^*_{uvw}$ output from the DC voltage control circuitry 13, the reactive power command value $Q^*_{uvw}$ output from the reactive power control circuitry 14, and the two-phase AC voltages $e_\alpha$, $e_\beta$ of the α-phase and β-phase (that is, α-phase and β-phase voltages $e_\alpha$, $e_\beta$ of the two-phase AC voltage: claimed "two-phase AC voltage of α-phase and β-phase") obtained or calculated by conversion by the three-phase to two-phase AC voltage conversion circuitry 15, more specifically, by substituting these values $P^*_{uvw}$, $Q^*_{uvw}$ and the voltages $e_\alpha$, $e_\beta$ as well as the total maximum system voltage value $E_{max}$ into Equation (1) above. On the other hand, the output current measurement circuitry 28 measures three-phase AC output currents (inverter output currents) $i_u$, $i_v$, $i_w$ (their instantaneous values), and outputs A/D converted three-phase AC output currents $i_u$, $i_v$, $i_w$ to the three-phase to two-phase AC current conversion circuitry (uvw/αβ) 17. The three-phase to two-phase AC current conversion circuitry 17 is configured to convert the three-phase AC output currents (inverter output currents) $i_u$, $i_v$, $i_w$ output from the output current measurement circuitry 28 to two-phase AC output currents $i_\alpha$, $i_\beta$ by using Equation (6) above.

Figure 3:
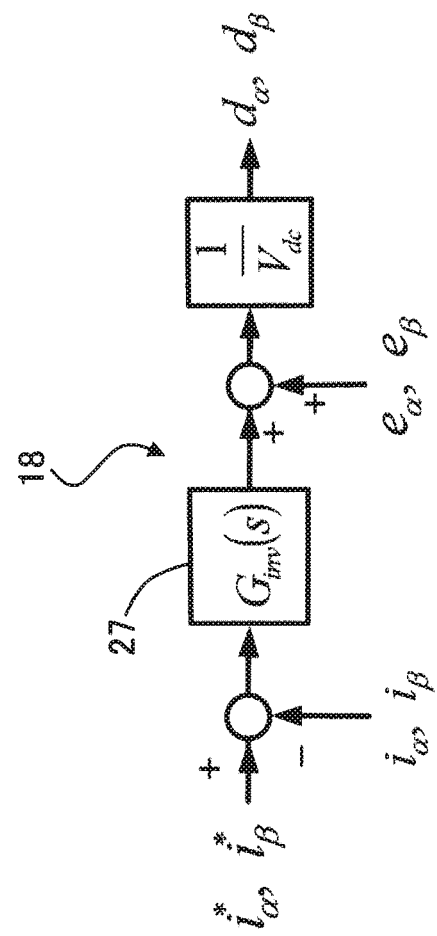
FIG. 3 is a schematic control block diagram of an output current control circuitry of FIG. 2.

The output current control circuitry 18 is configured to control the output current from the inverter 5. FIG. 3 is a schematic control block diagram of the output current control circuitry 18. As shown in FIG. 3, the output current control circuitry 18 comprises a current loop controller ($G_{inv}(s)$) 27 which, in normal operation mode, uses the two-phase AC output current command values $i^*_\alpha$, $i^*_\beta$ calculated by Equations (1) to (5) above and the two-phase AC output currents $i_\alpha$, $i_\beta$ calculated by Equation (6) above to perform a feedback control such that the values of the two-phase AC output currents $i_\alpha$, $i_\beta$ from the inverter 5 follow the two-phase AC output current command values $i^*_\alpha$, $i^*_\beta$ for the inverter 5. Further, as shown in FIG. 3, the output current control circuitry 18 calculates output duty ratios $d_\alpha$, $d_\beta$ of the α-phase and the β-phase, respectively, based on an adjustment value proportional to the difference between the two-phase AC output current command values $i^*_\alpha$, $i^*_\beta$ and the two-phase AC output currents $i_\alpha$, $i_\beta$, and based on the two-phase AC voltages $e_\alpha$, $e_\beta$ calculated by Equation (5) above, and also based on the DC bus voltage $V_{dc}$. These output duty ratios $d_\alpha$, $d_\beta$ are input to the PWM output unit 12 shown in FIG. 2.

As shown in FIG. 2, the PWM output unit 12 comprises a duty ratio two-phase to three-phase conversion circuitry (αβ/uvvv) 22, a third harmonic injection circuitry 23 and a PWM output control circuitry 24. By using Equation (7) above, the duty ratio two-phase to three-phase conversion circuitry 22 converts the output duty ratios $d_\alpha$, $d_\beta$ of the α-phase and the β-phase, respectively, to output duty ratios $d_u$, $d_v$, $d_w$ of the U-phase, the V-phase and the W-phase, respectively, which are input to the third harmonic injection circuitry 23. By using Equation (8) above, the third harmonic injection circuitry 23 calculates output duty ratio command values $d^*_u$, $d^*_v$, $d^*_w$, each containing a third harmonic injection component, from the output duty ratios $d_u$, $d_v$, $d_w$, respectively, and outputs the output duty ratio command values $d^*_u$, $d^*_v$, $d^*_w$ to the PWM output control circuitry 24. The PWM output control circuitry 24 generates PWM signals having pulse widths respectively corresponding to the output duty ratio command values $d^*_u$, $d^*_v$, $d^*_w$ input thereto. These PWM signals are used to switch or control the on/off of the switching elements S1 to S6 of the inverter 5. Thus, the switching elements S1 to S6 are switched by Third Harmonic Injected PWM (Pulse Width Modulation) method.

Figure 4A:
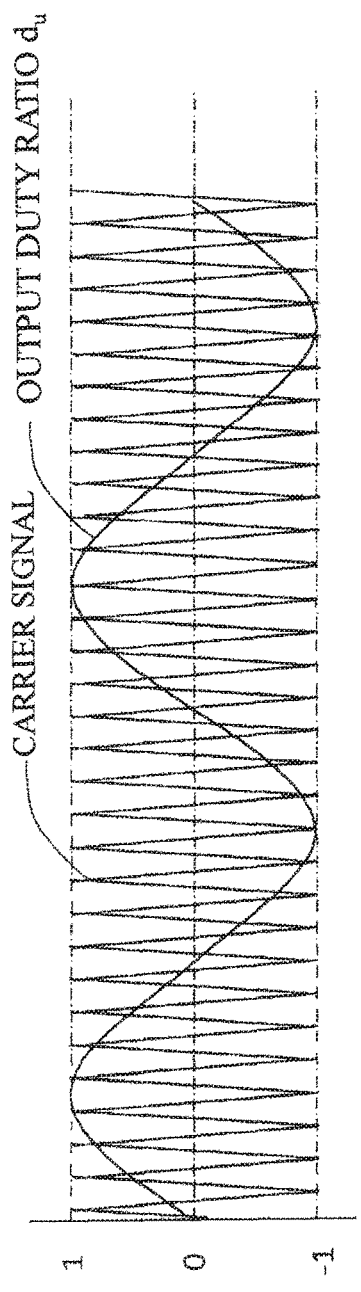
Figure 4B:
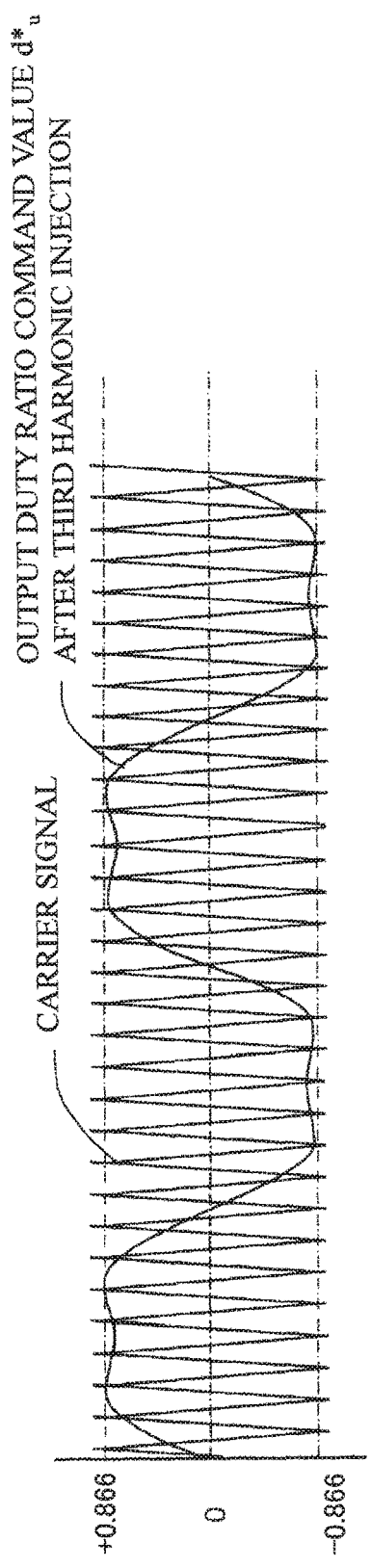
FIG. 4B is a schematic view showing waveforms of a carrier signal and an output duty ratio command value for Third Harmonic Injected PWM method.

The reason why Third Harmonic Injected PWM method is used for the power conditioner 1 of the present exemplary embodiment as described above is as follows. FIG. 4A is a schematic view showing waveforms of a carrier signal and an output duty ratio for normal SPWM (Sinusoidal Pulse Width Modulation) method, while FIG. 4B is a schematic view showing waveforms of a carrier signal and an output duty ratio command value for Third Harmonic Injected PWM method. First, assume that the peak value of a wave (modulated sinusoidal wave) with an output duty ratio $d_u$ is 1 when the wave does not contain a third harmonic injection as shown in FIG. 4A. Assuming that $d^*_u$ is an output duty ratio command value for a modified wave to be generated by injecting a third harmonic into the wave with the output duty ratio $d_u$, the peak value of the modified wave with the output duty ratio command value $d^*_u$ is a peak value of a wave generated by superimposing the third harmonic on the original sinusoidal wave with the output duty ratio $d_u$. The peak value of the wave with the output duty ratio command value d*$_u$ is considered to have a height at about 60 degrees of the original sinusoidal wave with the output duty ratio d$_u$. If output duty ratio d$_u$=sin 60°=√(3)/2, then by substituting this value into Equation (8), the output duty ratio command value d*$_u$ is calculated as √(3)/2≈0.866. Thus, as shown in FIG. 4B, the peak value of the wave with the output duty ratio command value d*$_u$, after the third harmonic injection, is 0.866.

This means that by appropriately superimposing a third harmonic in an inverter, such as the inverter 5, for connection to a three-phase system, it is possible to remove or cancel third harmonic components in line voltages and improve the output voltage utilization rate (ratio of output commercial system voltage to DC bus voltage V$_{dc}$) by about 15.4% (=1/0.866). Thus, when controlling a DC bus voltage to be constant in an inverter for connection to a three-phase system, the use of Third Harmonic Injected PWM method can reduce a command value for the DC bus voltage as compared with the case of using normal SPWM method, thereby making it possible to improve the conversion efficiency of the inverter for connection to the three-phase system.

Note that the control circuitry 7 calculates the feedback value Q of reactive power input to the reactive power control circuitry 14 by using Equation (9) above based on the two-phase AC voltages e$_\alpha$, e$_\beta$ obtained by the three-phase to two-phase AC voltage conversion circuitry 15 and the two-phase AC output currents i$_\alpha$, i$_\beta$ obtained by the three-phase to two-phase AC current conversion circuitry 17. Further, the output current control circuitry 18 comprises an instantaneous voltage drop detection circuitry 21. As described in detail later, the instantaneous voltage drop detection circuitry 21 is configured to detect an instantaneous voltage drop in the three-phase system 3.

The reason why the control circuitry 7 controls the output from the inverter 5 by using values obtained by converting the output from the inverter 5 to the α-β axis coordinate as described above rather than to the d-q axis coordinate as in the conventional method, is as follows.

(1) The control method using the αβ phase conversion method for three-phase to two-phase conversion is considered to correspond to an AC current control method of a single-phase inverter for grid connection (hereafter referred to simply as "single phase inverter"). This is because the control method using the αβ phase conversion method corresponds to, or is similar to, a method in which an AC current control for the single-phase inverter is performed for each of the α-phase and the β-phase.

(2) It is not necessary to provide or use a PLL (Phase Locked Loop) circuitry in contrast to the conventional control method using the dq phase conversion method. This is because, as shown in Equations (1) to (5), the control method using the αβ phase conversion method does not require the phase of the system voltage to calculate the two-phase AC output current command values i*$_\alpha$, i*$_\beta$ for the inverter 5, in contrast to the dq phase conversion method which requires the PLL circuitry due to the reason that the method converts the α-β axis coordinate to the d-q axis coordinate based on cosine wave and sine wave signals corresponding to the phase of the system voltage obtained by the PLL circuitry.

(3) Even if a single-phase short circuit fault or a two-phase short circuit fault occurs, the inverter 5 can operate continuously in a control method similar to that of a single-phase inverter. This is because at least one of the α and β phases can be controlled even if a single-phase or a two-phase short circuit fault occurs.

Next, in connection with reason (3) above, the reason why the power conditioner 1 of the present exemplary embodiment can perform a stable continuous operation when a two-phase short circuit fault occurs will be described. When a fault occurs in the three-phase system 3, a two-phase short circuit situation may occur. In the conventional control method using the dq phase conversion method, when a two-phase short circuit situation (two-phase short circuit fault) occurs, the phase angle of the system voltage obtained by the PLL circuitry is lost (that is, it becomes impossible to detect the phase angle), and thus the continuous operation of the power conversion device becomes impossible. Therefore, if the conventional dq phase conversion method is used, it is considered that the use of a special PLL circuitry is required for the continuous operation of the inverter 5 when a two-phase short circuit occurs.

As described above, the power conditioner 1 of the present exemplary embodiment uses the αβ phase conversion method to control the output from the inverter 5, and therefore, when a two-phase short circuit fault occurs, it is possible to perform a continuous operation of at least one of the two phases. First, when a short circuit occurs between the U-phase and the V-phase of the three-phase system 3, the line voltage e$_{uv}$ between the U-phase and the V-phase becomes 0 as shown in Equation (12) below, and the two-phase AC voltages e$_\alpha$, e$_\beta$ become the values shown in Equation (14) as calculated from Equations (12) and (5). Since the three-phase system voltage is unbalanced then, it is considered that E$_{max}$ (total maximum system voltage)=E$_{vw.max}$ (maximum value of line voltage) as shown in Equation (13).

Next, when a short circuit occurs between the V-phase and the W-phase of the three-phase system 3, the line voltage e$_{uw}$ between the V-phase and the W-phase becomes 0 as shown in Equation (15), and the two-phase AC voltages e$_\alpha$, e$_\beta$ become the values shown in Equation (17) as calculated from Equations (15) and (5). Since the three-phase system voltage is unbalanced then, it is considered that E$_{max}$ (total maximum system voltage)=E$_{uv.max}$ (maximum value of line voltage) as shown in Equation (16). On the other hand, when a short circuit occurs between the U-phase and the W-phase of the three-phase system 3, the line voltage e$_{uw}$ between the U-phase and the W-phase becomes 0 as shown in Equation (18), and the two-phase AC voltages e$_\alpha$, e$_\beta$ become the values shown in Equation (20) as calculated from Equations (18) and (5). Since the three-phase system voltage is unbalanced then, it is considered that E$_{max}$ (total maximum system voltage)=E$_{uv.max}$ (maximum value of line voltage) as shown in Equation (19).

In other words, when a two-phase short circuit fault occurs, the two-phase AC voltages e$_\alpha$, e$_\beta$ are formed by one line voltage similar to a single phase system voltage. Thus, by substituting Equations (12) to (20) into Equations (1) to (4), two-phase AC output current command values i*$_\alpha$, i*$_\beta$ similar to an output current command value for a single-phase inverter for grid connection can be obtained. Then, by using the control block of the output current control circuitry 18 shown in FIG. 3, an output current control similar to that of the single-phase inverter for grid connection can be performed even if a two-phase short circuit fault occurs. Note that all Equations (12) to (20) represent relationships between the two-phase AC voltage and the line voltages (three-phase AC voltage) considered based on the three kinds of two-phase short circuit faults without considering the system impedance. It is evident from the above that the power conditioner 1 of the present exemplary embodiment can perform a stable continuous operation even when a two-phase short circuit fault occurs.

$$e_{uv} = 0 \tag{12}$$

$$E_{max} = E_{vw\cdot max} \tag{13}$$

$$\begin{cases} e_\alpha = \frac{1}{3}e_{vw} \\ e_\beta = \frac{\sqrt{3}}{3}e_{vw} \end{cases} \tag{14}$$

$$e_{vw} = 0 \tag{15}$$

$$E_{max} = E_{uv\cdot max} \tag{16}$$

$$\begin{cases} e_\alpha = \frac{2}{3}e_{uv} \\ e_\beta = 0 \end{cases} \tag{17}$$

$$e_{uw} = 0 \tag{18}$$

$$E_{max} = E_{vw\cdot max} \tag{19}$$

$$\begin{cases} e_\alpha = -\frac{1}{3}e_{vw} \\ e_\beta = \frac{\sqrt{3}}{3}e_{vw} \end{cases} \tag{20}$$

Next, an output current control method of the power conditioner 1 of the present exemplary embodiment when an instantaneous voltage drop occurs will be described. When an instantaneous voltage drop occurs in the three-phase system 3, the instantaneous voltage drop detection circuitry 21 (refer to FIG. 2) detects the instantaneous voltage drop based on the maximum values $E_{uv.max}$, $E_{vw.max}$, $E_{uw.max}$ of the respective three line voltages obtained by the average voltage detection circuitry 20 using Equation (4), and based on the maximum three-phase instantaneous voltage value $E_{uvw.max}$ obtained by the instantaneous voltage detection circuitry 19 using Equation (2). Then, the output current control circuitry 18 uses Equation (22) below to obtain a minimum value $E_{min}$ which is a larger value selected from either a preset lower limit value $E_{cst}$ of each line voltage or a minimum value among the four maximum voltage values which are the above three maximum values $E_{uv.max}$, $E_{vw.max}$ and $E_{uw.max}$ of the three line voltages and the maximum three-phase instantaneous voltage value $E_{uvw.max}$, and then uses Equation (21) below to reduce the two-phase AC output current command values for the inverter 5 to those corresponding to the minimum value $E_{min}$, so as to limit or suppress the values of the inverter output currents $i_u$, $i_v$, $i_w$ of the respective phases.

In Equation (21), $i^*_{\alpha \cdot FRT}$ and $i^*_{\beta \cdot FRT}$ respectively represent two-phase AC output current command values of the α-phase and the β-phase in FRT (Fault Ride Through) mode, including when an instantaneous voltage drop occurs, while $E_{rated}$ represents an effective value (root mean square value) (202 Vrms) of the rated voltage of the line voltage of the three-phase system 3. Note that in the power conditioner 1 of the present exemplary embodiment, when a three-phase short circuit fault occurs (that is, when all the three line voltages of the three-phase system 3 are zero), the value of each of the inverter output currents $i_u$, $i_v$, $i_w$ is limited to an output current value corresponding to the preset lower limit value $E_{cst}$ of each line voltage, by using Equations (21) and (22) below, but it is also possible to temporarily stop the output of the PWM signals by using a gate block.

$$\begin{bmatrix} i^*_{\alpha \cdot FRT} \\ i^*_{\beta \cdot FRT} \end{bmatrix} = \frac{E_{min}}{\sqrt{2} \cdot E_{rated}} \cdot \begin{bmatrix} i^*_\alpha \\ i^*_\beta \end{bmatrix} \tag{21}$$

$$E_{min} = \max\{\min\{E_{uvw\cdot max}, E_{n\cdot max}\}, E_{cst}\} \tag{22}$$

Figure 5:
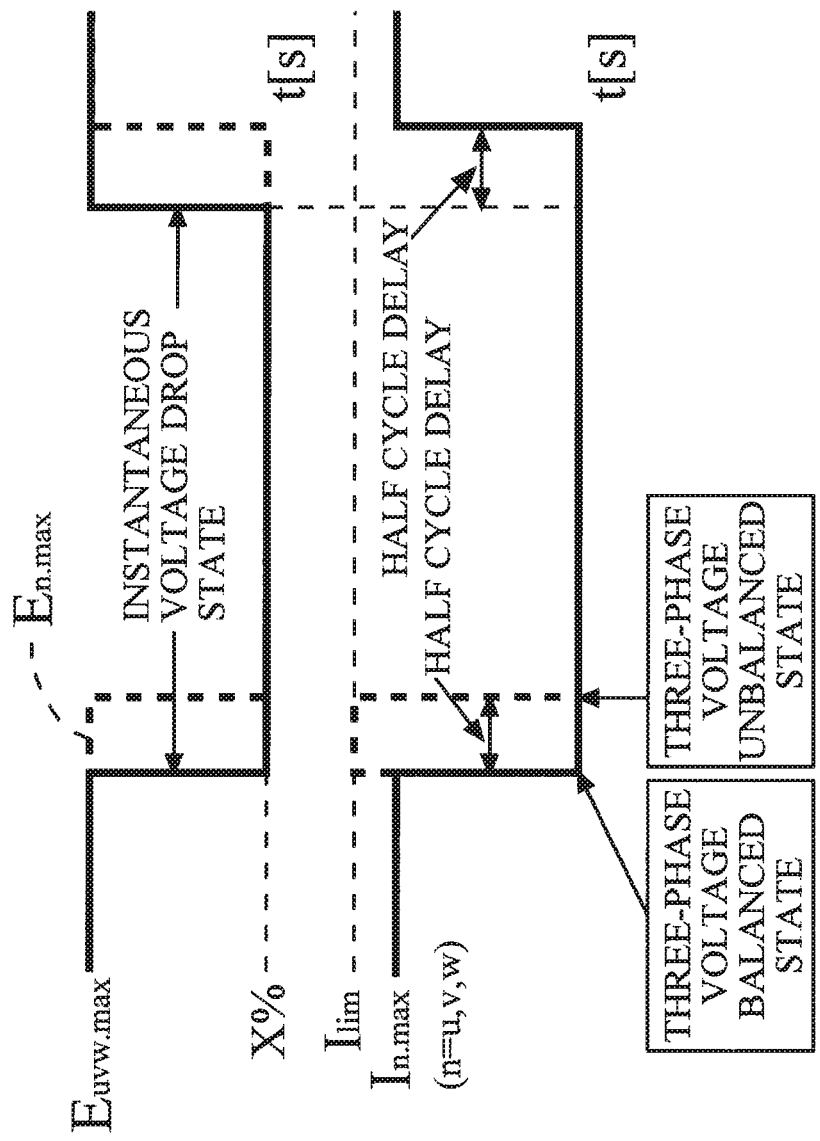
FIG. 5 is a schematic timing chart showing a relationship between a maximum value of each line voltage, a maximum value of an instantaneous three-phase voltage and a maximum value of an output current of each phase in the power conditioner when an instantaneous voltage drop occurs.

FIG. 5 is a schematic timing chart showing a relationship between the maximum value $E_{n.max}$ of each line voltage, the maximum three-phase instantaneous voltage value $E_{uvw.max}$ and a maximum value $I_{n.max}$ of an output current of each of the U-phase, V-phase and W-phase in the power conditioner 1 when an instantaneous voltage drop occurs. As shown in Equation (2), the maximum three-phase instantaneous voltage value $E_{uvw.max}$ is calculated by using the two-phase AC voltages $e_\alpha$, $e_\beta$. On the other hand, as shown in Equation (4), the maximum value $E_{n.max}$ of each line voltage is calculated by multiplying an effective value of each line voltage $e_n$ by the square root of 2, while the effective value of each line voltage $e_n$ is calculated for one half period (half cycle) (that is, $T_{Grid.avg}/2$) of the voltage waveform of the three-phase system 3. Because of this difference in calculation between Equations (2) and (4), the instantaneous voltage drop detection circuitry 21 (refer to FIG. 2) detects a drop in the maximum three-phase instantaneous voltage value $E_{uvw.max}$ before detecting a drop in the maximum value $E_{n.max}$ of each line voltage when the three-phase system voltage is balanced. Thus, when the three-phase system voltage is balanced, the output current control circuitry 18 instantaneously limits the inverter output currents $i_u$, $i_v$, $i_w$ as shown in FIG. 5 based on the result of detection by the instantaneous voltage drop detection circuitry 21.

On the other hand, total maximum system voltage value $E_{max}=E_{n.max}$ when the three-phase system voltage is unbalanced as described above, while as evident from Equation (4), the time required to calculate the maximum value $E_{n.max}$ of each line voltage is the period of one half cycle of the system voltage. Thus, as shown in FIG. 5, one half cycle after the instantaneous voltage drop, the instantaneous voltage drop detection circuitry 21 detects the drop in the maximum value $E_{n.max}$ of each line voltage. Therefore, when the three-phase system voltage is unbalanced, the output current control circuitry 18 limits the inverter output currents $i_u$, $i_v$, $i_w$ of the respective phases, one half cycle after the instantaneous voltage drop as shown in FIG. 5, based on the result of detection by the instantaneous voltage drop detection circuitry 21. Then, the output current control circuitry 18 changes the two-phase AC output current command values $i^*_\alpha$, $i^*_\beta$ for the inverter 5 to the two-phase AC output current command values $i^*_{\alpha.FRT}$, $i^*_{\beta.FRT}$ in FRT mode as shown in Equation (21).

Note, however, that the time when the output current control circuitry 18 limits the inverter output currents $i_u$, $i_v$, $i_w$ of the respective phases based on the result of detection by the instantaneous voltage drop detection circuitry 21 is one half cycle of the system voltage after the time when the instantaneous voltage drop occurs. During the one half cycle of the system voltage from when the instantaneous voltage drop occurs, the output current control circuitry 18 limits (suppresses) the values of the inverter output currents $i_u$, $i_v$, $i_w$ of the respective phases to a predetermined upper limit value $I_{lim}$ of the output current from the inverter 5. Note that even if the inverter output currents $i_u$, $i_v$, $i_w$ are output to the upper limit value $I_{lim}$ during the one half cycle of the system voltage, its influence on an upstream (higher voltage) power system (grid) is considered to be little.

Further, from Equations (3), (4), (21) and (22), it is found that the time required to release the limit of the inverter output currents $i_u$, $i_v$, $i_w$ of the respective phases, after recovery of the system voltage, is one half cycle after the recovery of the system voltage as shown in FIG. 5, regardless of whether the three-phase system voltage is balanced or unbalanced. This is because even after the recovery of the system voltage, a delay time of one half cycle is always required to calculate the maximum value $E_{n.max}$ of each line voltage as shown in Equation (4). Further, by substituting a minimum value $E_{min}$ calculated from Equation (22) into Equation (21), it is found that during the time from the recovery of the system voltage to the lapse of the half cycle after the recover of the system voltage, the two-phase AC output current command values are kept as the two-phase AC output current command values $i^*_{\alpha.FRT}$, $i^*_{\beta.FRT}$ in FRT mode. Note that the percentage X % shown in FIG. 5 represents a percentage of residual voltage.

Also note that as shown in Equation (22), when an instantaneous voltage drop is detected by the instantaneous voltage drop detection circuitry 21, and when a minimum value $E_{min}$ among the maximum three-phase instantaneous voltage value (amplitude) $E_{uvw.max}$ detected by the instantaneous voltage detection circuitry 19 and the amplitudes (maximum values) $E_{uv.max}$, $E_{uv.max}$, $E_{uw.max}$ of the three line voltages detected by the average voltage detection circuitry 20 is lower than the preset lower limit value $E_{cst}$ of each line voltage (claimed "line voltage lower limit value"), the output current control circuitry 18 reduces the values of the inverter output currents $i_u$, $i_v$, $i_w$ of the respective phases to an output current value corresponding to the lower limit value $E_{cst}$ of each line voltage.

Figure 6:
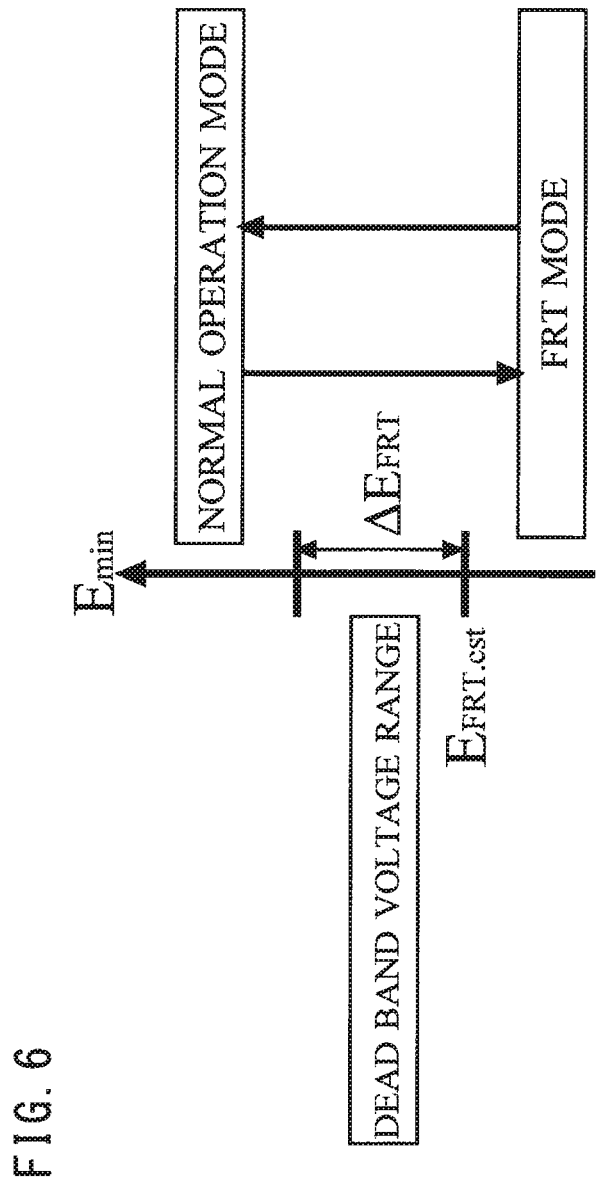
FIG. 6 is a chart for explaining a method of switching between normal operation mode and FRT mode of the power conditioner.

FIG. 6 is a chart for explaining a method of switching between normal operation mode and FRT mode of the power conditioner 1. When the minimum value $E_{max}$ among the four maximum voltage values, which are the maximum three-phase instantaneous voltage value $E_{uv.max}$ detected by the instantaneous voltage detection circuitry 19 and the three maximum values $E_{uv.max}$, $E_{vw.max}$ and $E_{uw.max}$ of the three line voltages detected by the average voltage detection circuitry 20, becomes equal to or lower than a predetermined threshold $E_{FRT.cst}$, the instantaneous voltage drop detection circuitry 21 (refer to FIG. 2) detects that an instantaneous voltage drop has occurred in the three-phase system 3. When the instantaneous voltage drop detection circuitry 21 detects the occurrence of the instantaneous voltage drop in the three-phase system 3, the output current control circuitry 18 shifts to (that is, is switched to) FRT mode, and performs output current control based on Equations (21) and (22) so as to limit the inverter output currents $i_u$, $i_v$, $i_w$ of the respective phases. Further, when the minimum value $E_{min}$ changes from a value equal to or lower than the threshold $E_{FRT.cst}$ to a value higher than the threshold $E_{FRT.cst}$ by equal to or more than a predetermined value $\Delta E_{FRT}$, the instantaneous voltage drop detection circuitry 21 detects that the voltage of the three-phase system 3 has recovered to a normal voltage value. Here, $\Delta E_{FRT}$ is a dead band voltage range provided to improve the stability of the control system.

When the instantaneous voltage drop detection circuitry 21 detects the recovery of the three-phase system 3 to the normal voltage value, the output current control circuitry 18 shifts to (that is, is switched to) normal operation mode from FRT mode, and controls the inverter output currents $i_u$, $i_v$, $i_w$ of the respective phases according to Equations (1) to (4). Note that even when an instantaneous voltage drop occurs in the three-phase system 3 in normal operation mode, the output current control circuitry 18 limits (suppresses) the value of each of the inverter output currents $i_u$, $i_v$, $i_w$ of the respective phases to the upper limit value $I_{lim}$, if the minimum value $E_{min}$ among the four maximum voltage values, which are the maximum three-phase instantaneous voltage value $E_{uvw.max}$ and the maximum values $E_{uv.max}$, $E_{vw.max}$ and $E_{uw.max}$ of the three line voltages, is higher than the threshold $E_{FRT.cst}$. Note, however, that even in this case, the inverter 5 (DC voltage control circuitry 13) continues to control the DC bus voltage to be constant, if the inverter output currents $i_u$, $i_v$, $i_w$ do not reach the upper limit value $I_{lim}$.

As described above, regardless of whether the three-phase system voltage is balanced or unbalanced, the power conditioner 1 of the present exemplary embodiment can limit or suppress the inverter output currents $i_u$, $i_v$, $i_w$ to prevent the occurrence of an overcurrent, and therefore can perform a stable continuous operation when an instantaneous voltage drop occurs, such as when a single-phase short circuit fault or a two-phase short circuit fault occurs in the three-phase system. In order to confirm the effect of the power conditioner 1 of the present exemplary embodiment, a simulation test was performed. FIG. 7 is a table showing values of parameters set in simulations of operation of the power conditioner 1 when an instantaneous voltage drop occurs. In the table of FIG. 7, $T_d$ represents a dead time (during which both upper and lower arms, such as switching elements S1 and S2, of the switching elements S1 to S6 of the inverter 5 are turned off). Further, the Switching Frequency in the table of FIG. 7 is a switching frequency of each of the switching elements S1 to S6 of the inverter 5.

FIG. 8 is a table showing conditions for the simulations of the operation of the power conditioner 1 when the instantaneous voltage drop is generated or occurs. In the table of FIG. 8, $e_u$, $e_v$ and $e_w$ represent respective phase voltages of the three-phase system 3, showing their effective values. As shown in the table of FIG. 8, the simulations of the power conditioner 1 were performed where the three phases of the power supply of the three phase system 3 are Δ-connected in all conditions CD to ⑥. In the table of FIG. 8, condition ① is a condition for simulation where the minimum value $E_{min}$ is higher than the threshold $E_{FRT.cst}$ when the three-phase system voltage is balanced, although an instantaneous voltage drop has occurred in the three-phase system 3.

In condition ④, in order to confirm the superiority of the control method of the power conditioner 1 (its inverter 5), a common difference of 50V was given between the amounts of reduction in the effective values of the respective phase voltages $e_u$, $e_v$ and $e_w$ when the instantaneous voltage drop occurs. More specifically, in condition ④, when the instantaneous voltage drop occurs, the amount of reduction in the effective value of the phase voltage $e_u$ is 50V, and the amount of reduction in the effective value of the phase voltage $e_v$ is 100V, while the amount of reduction in the effective value of the phase voltage $e_w$ is 150V. In condition ④, not only the three-phase system voltage is unbalanced before the instantaneous voltage drop occurs, but also there is an unbalance in the amount of reduction in the three-phase AC voltage when the instantaneous voltage drop occurs. On the other hand, conditions ⑤ and ⑥ are a condition of single-phase short circuit and a condition of two-phase short circuit as the most severe condition, respectively, and are those in which the three-phase system voltage is unbalanced. Under these conditions ① to ⑥, the simulations were performed.

Figure 9:
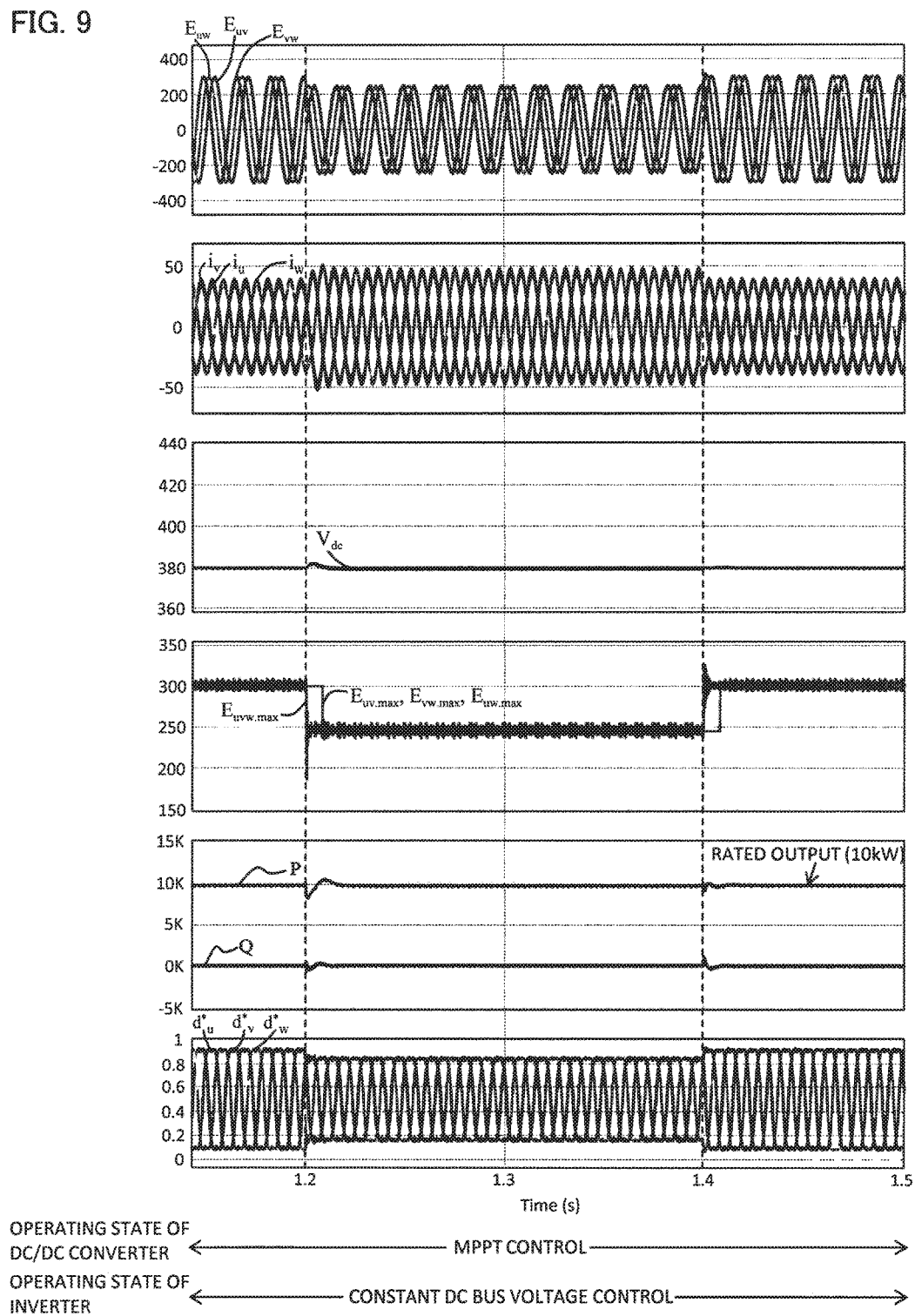
FIG. 9 is a set of graphs showing results of the simulation under condition ① in the table of FIG. 8.

FIG. 9 is a set of graphs showing results of the simulation under condition ① in the table of FIG. 8. Referring to FIG. 9, the peak values of the inverter output currents $i_u$, $i_v$, $i_w$ are about 50 A when an instantaneous voltage drop at a level which causes the minimum value $E_{min}$ described above to be higher than the threshold $E_{FRT.cst}$ occurs. At this time, the peak values of the inverter output currents $i_u$, $i_v$, $i_w$ are lower than the upper limit value $I_{lim}$ (60 A) of the inverter output currents. Thus, it could be confirmed that the inverter 5 (DC voltage control circuitry 13) always controls the DC bus voltage to be constant, and continuously outputs instantaneous active power P to the rated output (10 kW).

Figure 10:
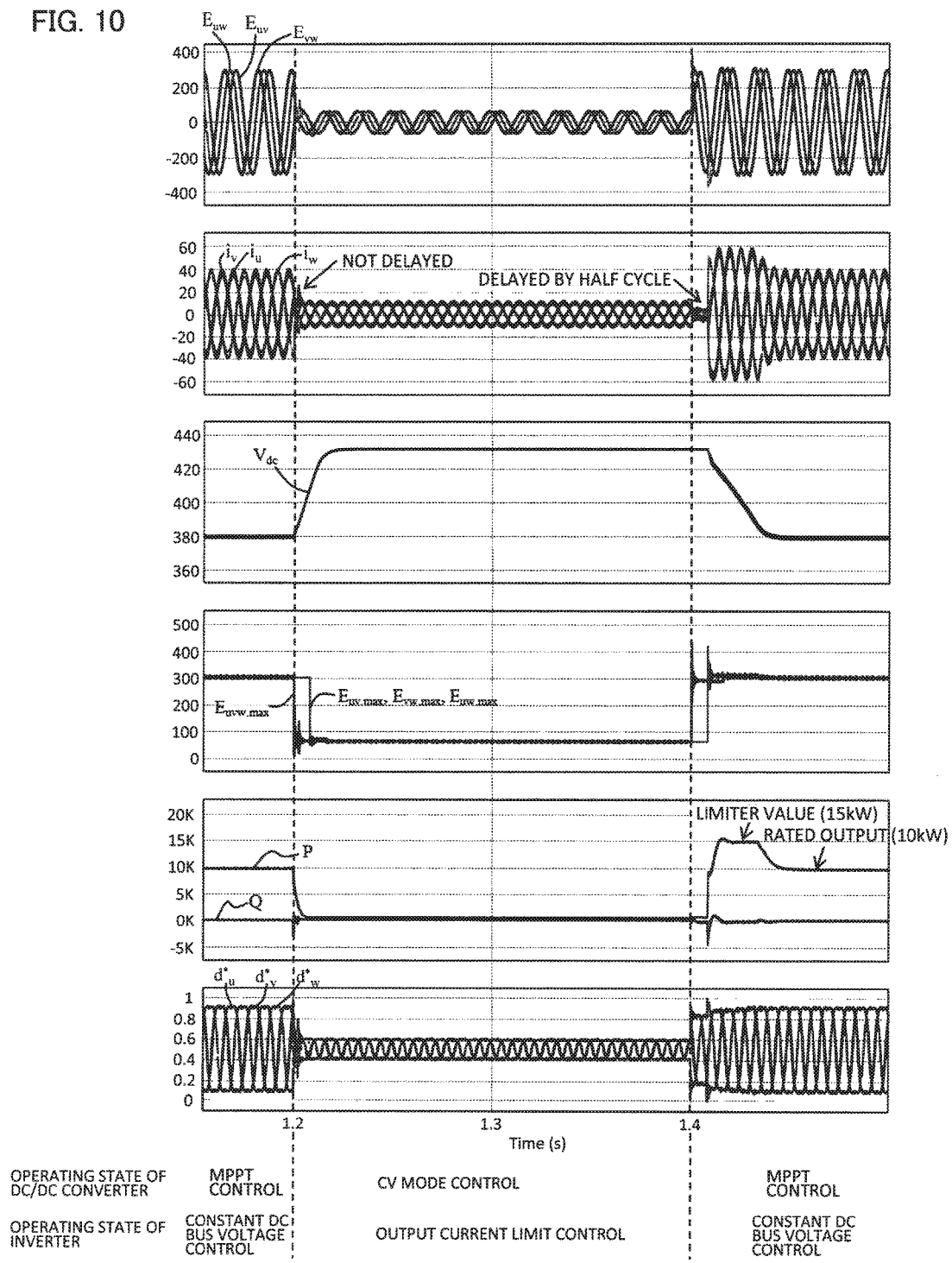
FIG. 10 is a set of graphs showing results of the simulation under condition ② in the table of FIG. 8.

FIG. 10 is a set of graphs showing results of the simulation under condition ② in the table of FIG. 8. In FIG. 10 and FIGS. 11 to 14 below, $E_{uv}$, $E_{vw}$ and $E_{uw}$ represent instantaneous values of the line voltages $e_{uv}$, $e_{vw}$ and $e_{uw}$, respectively. It was confirmed that at about 1.2 seconds (s) in FIG. 10, the effective values of the respective phase voltages $e_u$, $e_v$ and $e_w$ are changed from 202V to 41V, and the inverter output currents $i_u$, $i_v$, $i_w$ are limited (reduced or suppressed) corresponding to the maximum three-phase instantaneous voltage value $E_{uvw.max}$ as shown in FIG. 5. Further, it was confirmed that the system voltage ($E_{uv}$, $E_{vw}$, $E_{uw}$) recovers at about 1.4 seconds, and also the inverter output currents $i_u$, $i_v$, $i_w$ recover to the rated output about one half cycle after the recovery of the system voltage. It was further confirmed that thereafter the power conditioner 1 controls the DC bus voltage $V_{dc}$ to be constant, thereby stabilizing the DC bus voltage $V_{dc}$ at about 380V.

Here, the reason why the instantaneous active power P (15 kW) of 1.5 times the rated output (10 kW) is temporarily output after the recovery of the system voltage is because in the simulation, the limiter value of the output power is designed to be 1.5 times the rated output (upper limit value $I_{lim}$ of the inverter output current=60 A). Note that during the time from 1.2 seconds to 1.4 seconds in FIG. 10, the inverter output $i_u$, $i_v$, are limited, and therefore the inverter 5 (DC voltage control circuitry 13) loses the ability to control the DC bus voltage to be constant. At this time, the control of the DC/DC converter 4 is switched from normal MPPT control to CV (Constant Voltage) mode control, whereby the DC bus voltage $V_{dc}$ has a value in a certain range (from 420V to 440V) as shown in FIG. 10. This point similarly applies to FIGS. 11 to 13 (results of the simulations under conditions ③ to ⑥ in the table of FIG. 8) described later.

Figure 11:
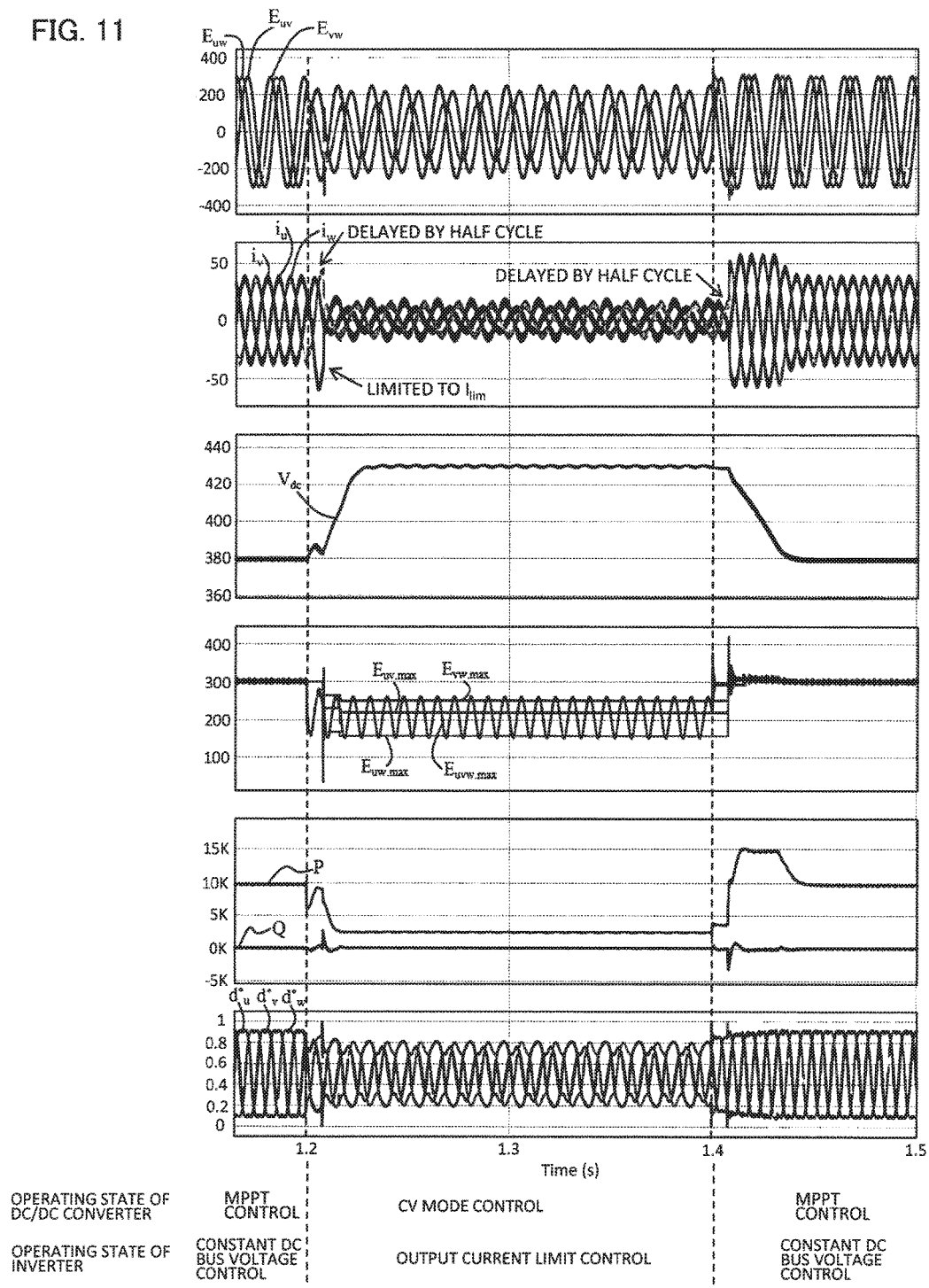
FIG. 11 is a set of graphs showing results of the simulation under condition ③ in the table of FIG. 8.

FIG. 11 is a set of graphs showing results of the simulation under condition ③ in the table of FIG. 8. At about 1.2 seconds in FIG. 11, a sudden phase change with a voltage drop (instantaneous voltage drop) in the respective phase voltages $e_u$, $e_v$ and $e_w$ was generated. It was confirmed that under condition ③, the three-phase system voltage becomes unbalanced after the voltage drop, and thus the values of the inverter output currents $i_u$, $i_v$, $i_w$ are limited to the upper limit value $I_{lim}$ of the inverter output current, in which one half cycle thereafter the inverter output currents $i_u$, $i_v$, $i_w$ are limited. Further, it was confirmed that during the instantaneous voltage drop, the power conditioner 1 limits the inverter output currents $i_u$, $i_v$, $i_w$ so as to perform a continuous operation. It was also confirmed that the inverter output currents $i_u$, $i_v$, $i_w$ recover to the rated output one half cycle after the recovery of the system voltage, and the power conditioner 1 controls the DC bus voltage $V_{dc}$ to be constant.

Figure 12:
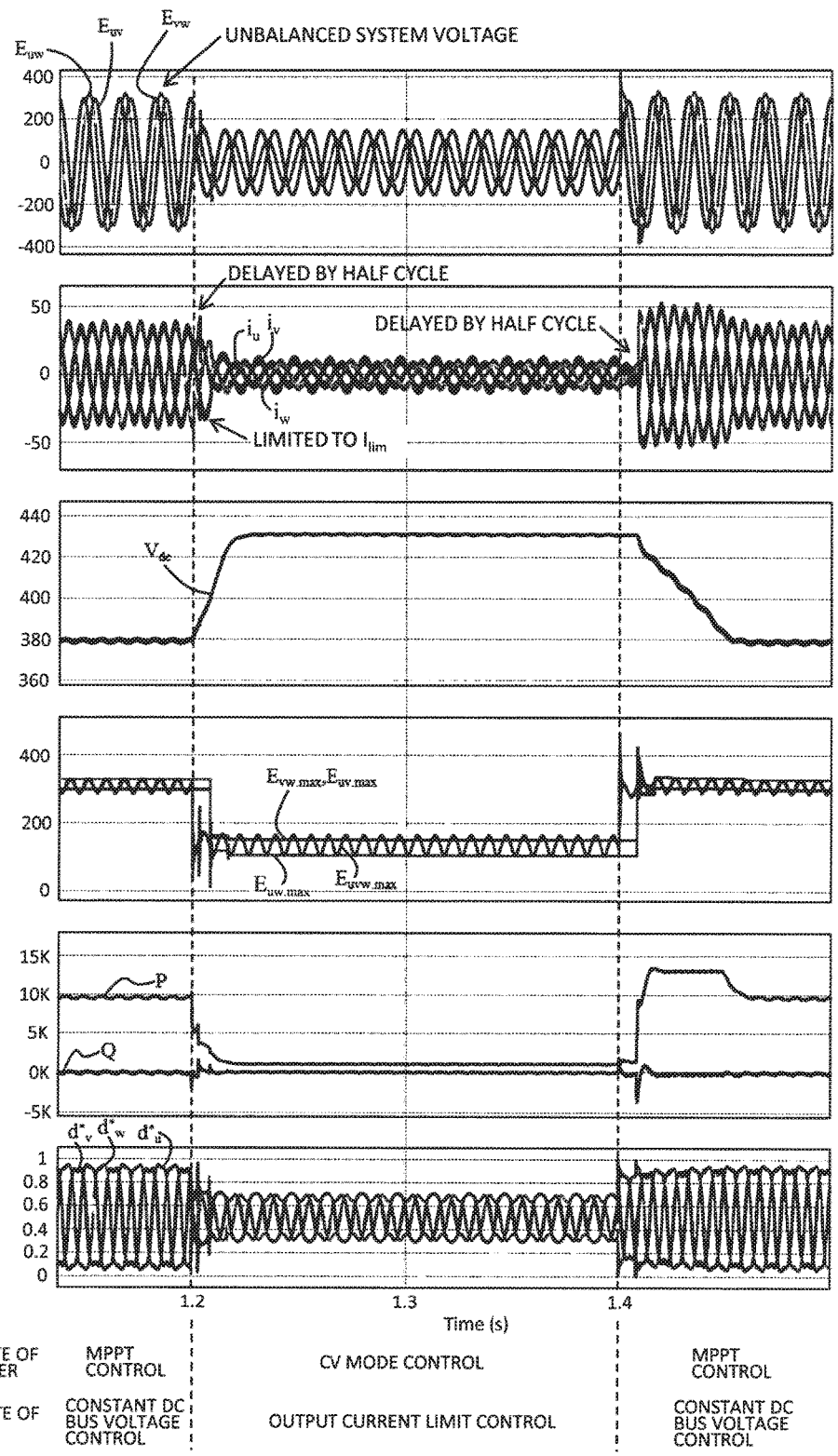
FIG. 12 is a set of graphs showing results of the simulation under condition ④ in the table of FIG. 8.

FIG. 12 is a set of graphs showing results of the simulation under condition ④ in the table of FIG. 8. It was confirmed that the power conditioner 1 limits the inverter output currents $i_u$, $i_v$, $i_w$ so as to perform a stable continuous operation even in the case where the system voltage is extremely unbalanced as in condition ④. Further, it was confirmed that as shown in FIG. 12, the power conditioner 1 can perform a continuous operation without a problem even after the system voltage recovers at about 1.4 seconds from the system fault (instantaneous voltage drop) which is generated or occurs at about 1.2 seconds.

Figure 13:
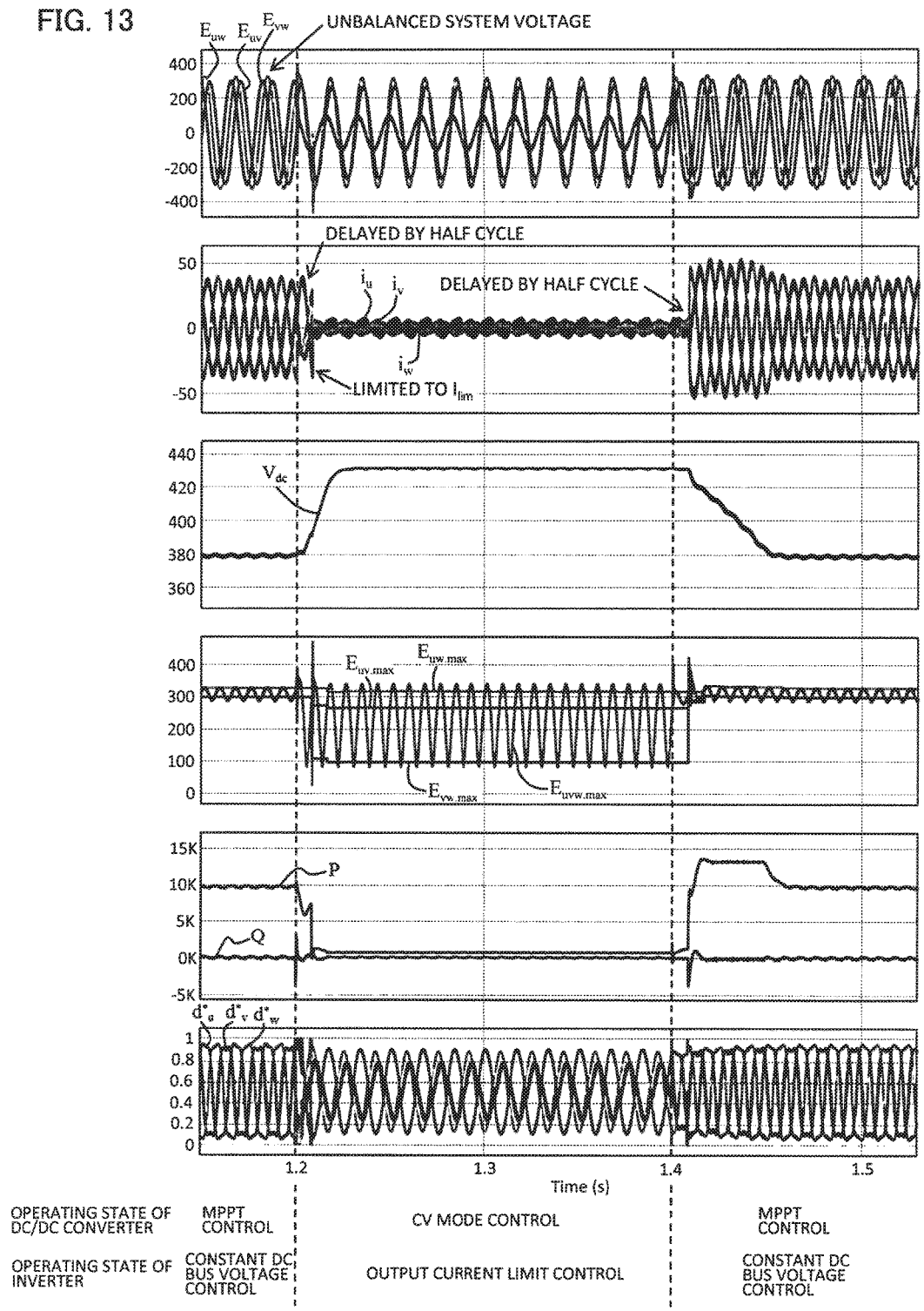
FIG. 13 is a set of graphs showing results of the simulation under condition ⑤ in the table of FIG. 8.

FIG. 13 is a set of graphs showing results of the simulation under condition ⑤ in the table of FIG. 8. It was confirmed that the power conditioner 1 limits the inverter output currents $i_u$, $i_v$, $i_w$ so as to perform a stable continuous operation during the time of instantaneous voltage drop (from 1.2 seconds to 1.4 seconds) as shown in FIG. 13, even in the case where the V-phase is short-circuited when the system voltage is unbalanced as in condition ⑤. Further, it was confirmed that as shown in FIG. 13, the power conditioner 1 can perform a continuous operation without a problem even after the system voltage recovers at about 1.4 seconds from the system fault (instantaneous voltage drop).

Figure 14:
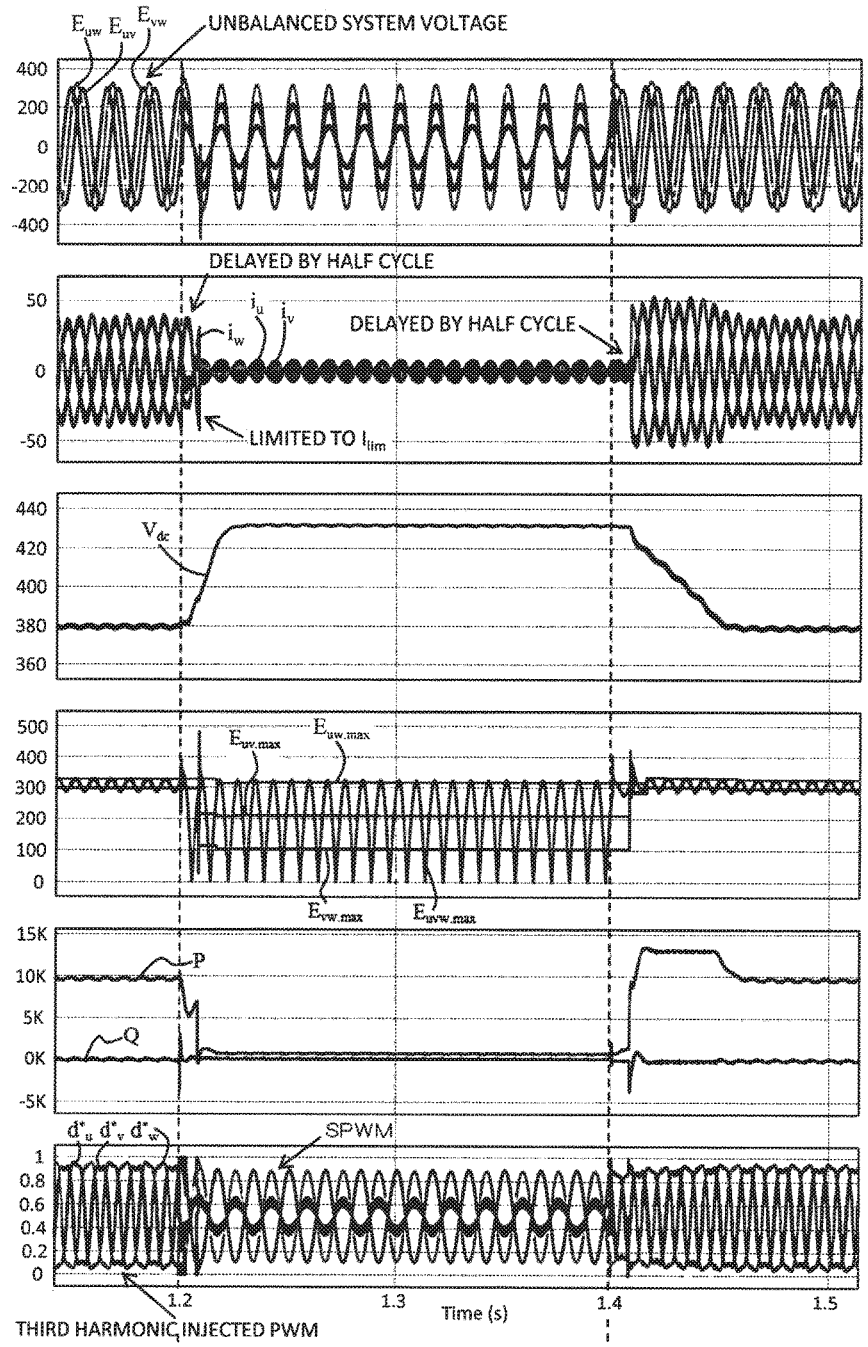
FIG. 14 is a set of graphs showing results of the simulation under condition ⑥ in the table of FIG. 8.

FIG. 14 is a set of graphs showing results of the simulation under condition ⑥ in the table of FIG. 8. In condition ⑥, two phases, the U-phase and the V-phase, were short-circuited when the system voltage is unbalanced. During the time of instantaneous voltage drop (from 1.2 seconds to 1.4 seconds) due to the two-phase short circuit, the instantaneous α-phase and β-phase AC voltages $e_α$, $e_β$ (two-phase AC voltages) are formed by one kind of line voltage $e_{vw}$ as shown in Equation (14), which is similar to a single-phase system voltage. Thus, the two-phase AC output current command values $i^*_α$, $i^*_β$, which are generated based on the instantaneous α-phase and β-phase AC voltages $e_α$, $e_β$, are similar to output current command values for a single-phase inverter for grid connection. It was confirmed that by then changing the output control method in the PWM output unit 12 from Third Harmonic Injected PWM method to SPWM method, which is used in a single-phase inverter for grid connection, the power conditioner 1 performs a continuous operation without a problem even during the time of instantaneous voltage drop. It was also confirmed that thereafter the power conditioner 1 outputs three-phase power after the system voltage recovers at about 1.4 seconds. Note that all the results of simulations of the instantaneous active power P and the instantaneous reactive power Q in FIGS. 9 to 14 show the values of those passed through a low-pass filter to remove the 2f component.

The results of the simulations described above are summarized as follows.

(1) It was confirmed that the output current control method described above can stabilize the output current from the inverter 5, regardless of whether the three-phase system voltage is balanced or unbalanced.

(2) It was confirmed that when an instantaneous voltage drop occurs in the three-phase system 3, the power conditioner 1 can perform a stable continuous operation by limiting (suppressing or reducing) the output current command value for the inverter 5 depending on a minimum value among the four maximum voltage values, which are the maximum three-phase instantaneous voltage value $E_{uvw.max}$ and the three maximum values $E_{uv.max}$, $E_{vw.max}$ and $E_{uw.max}$ of the three line voltages.

(3) It was confirmed that during one half cycle until the power conditioner 1 limits (suppresses) the inverter output currents $i_u$, $i_v$, $i_w$ when the system voltage is unbalanced and an instantaneous voltage drop occurs, the power conditioner 1 limits the values of the inverter output currents $i_u$, $i_v$, $i_w$ to an upper limit value $I_{lim}$ of the output current from the inverter 5.

(4) It was confirmed that even when a single-phase short circuit or a two-phase short circuit occurs while an instantaneous voltage drop occurs in the three-phase system 3, the power conditioner 1 can perform a continuous operation.

From the results of the above simulations, the usefulness of the control method of the power conditioner 1 of the present exemplary embodiment has been made clear.

As described above, according to the power conditioner 1 of the present exemplary embodiment, when an instantaneous voltage drop occurs in the three-phase system 3, the values of the inverter output currents $i_u$, $i_v$, $i_w$ can be reduced (limited) to an output current value corresponding to a minimum value $E_{min}$ among the four maximum voltage values, which are the detected maximum three-phase instantaneous voltage value (amplitude) $E_{uvw.max}$ and the detected three maximum values (amplitudes) $E_{uv.max}$, $E_{vw.max}$ and $E_{uw.max}$ of the three line voltages. Here, as described above, the concept used to calculate the total maximum system voltage value $E_{max}$ is that total maximum system voltage value $E_{max}$=maximum three-phase instantaneous voltage value $E_{uvw.max}$=maximum value $E_{n.max}$ of each line voltage when the three-phase system voltage is balanced, while total maximum system voltage value $E_{max}$=maximum value $E_{n.max}$ of each line voltage when the three-phase system voltage is unbalanced.

Thus, when an instantaneous voltage drop occurs in the three-phase system 3, the values of the inverter output currents $i_u$, $i_v$, $i_w$ are reduced (suppressed or limited) to an output current value corresponding to a minimum value $E_{min}$ among the four maximum voltage values, which are the detected maximum three-phase instantaneous voltage value (amplitude) $E_{uvw.max}$ and the detected three maximum values (amplitudes) $E_{uv.max}$, $E_{vw.max}$ and $E_{uw.max}$ of the three line voltages as described above, so as to make it possible to suppress (limit) the inverter output currents $i_u$, $i_v$, $i_w$ to prevent the occurrence of an overcurrent, and thereby to perform a stable continuous operation of the power conditioner 1, regardless of whether the three-phase system voltage is balanced or unbalanced. Further, there is no risk that an upstream power system may become unstable, since the inverter output currents are suppressed (reduced or limited) when the instantaneous voltage drop is detected.

Further, according to the power conditioner 1 of the present exemplary embodiment, the output current command value calculation circuitry 16 is configured to calculate two-phase AC output current command values $i^*_\alpha$, $i^*_\beta$ of the α-phase and the β-phase for the inverter 5 based on the active power command value $P^*_{uvw}$ output from the DC voltage control circuitry 13, the reactive power command value $Q^*_{uvw}$ output from the reactive power control circuitry 14, and the two-phase AC voltages $e_\alpha$, $e_\beta$ of the α-phase and β-phase obtained by conversion by the three-phase to two-phase AC voltage conversion circuitry 15. On the other hand, the output current control circuitry 18 is configured to control the values of the inverter output currents $i_u$, $i_v$, $i_w$ based the two-phase AC output current command values $i^*_\alpha$, $i^*_\beta$ calculated by the output current command value calculation circuitry 16.

As described above, according to the power conditioner 1 of the present exemplary embodiment, the output from the inverter 5 is designed to be controlled by using values obtained by converting the output from the inverter 5 to the α-β axis coordinate rather than to the d-q axis coordinate as in the conventional control method, so as to make it possible to perform an output current control similar to that of a single-phase inverter for grid connection. Furthermore, it is not necessary to provide a PLL circuitry in contrast to the conventional control method using the dq phase conversion method, and therefore the manufacturing cost of the power conditioner 1 can be reduced. In addition, a delay in the control system due to a phase delay is prevented as compared with the conventional dq phase conversion method using a PLL circuitry, making it possible to improve the response of the control system. Further, the output from the inverter 5 is controlled by using the two-phase AC output current command values $i^*_\alpha$, $i^*_\beta$ converted to the α-β axis coordinate as described above. Therefore, even if a single-phase short circuit fault or a two-phase short circuit fault occurs, at least one of the α and β phases can be controlled, and thus the inverter 5 can operate continuously in a control method similar to that of a single-phase inverter.

Moreover, according to the power conditioner 1 of the present exemplary embodiment as described above, the effective values of the three line voltages are calculated for one half period (half cycle) of the voltage waveform of the three-phase system 3, and the effective values of the three line voltages are multiplied by the square root of 2 to obtain the maximum values $E_{uv.max}$, $E_{vw.max}$, $E_{uw.max}$ of the three line voltages. Here, the minimum value $E_{min}$ among them when the three-phase system voltage is unbalanced is a minimum value among the maximum values $E_{n.max}$ (maximum values $E_{uv.max}$, $E_{vw.max}$, $E_{uw.max}$ of the respective three line voltages). Since the maximum values of the three line voltages are calculated for the period of one half cycle of the voltage waveform of the three-phase system 3 as described above, the time required to accurately calculate the maximum values $E_{uv.max}$, $E_{vw.max}$, $E_{uw.max}$ of the respective three line voltages is thus about one half cycle of the voltage waveform of the three-phase system 3. Therefore, when the three-phase system voltage is unbalanced and an instantaneous voltage drop occurs, the values of the inverter output currents $i_u$, $i_v$, $i_w$ can be reduced in a period of about one half cycle of the voltage waveform of the three-phase system 3.

Further, according to the power conditioner 1 of the present exemplary embodiment, when an instantaneous voltage drop is detected by the instantaneous voltage drop detection circuitry 21, and when a minimum value $E_{min}$ among the four maximum voltage values, which are the maximum three-phase instantaneous voltage value $E_{uvw.max}$ detected by the instantaneous voltage detection circuitry 19 and the maximum values $E_{uv.max}$, $E_{vw.max}$, $E_{uw.max}$ of the three line voltages detected by the average voltage detection circuitry 20, is lower than the preset lower limit value $E_{cst}$ of each line voltage (claimed "line voltage lower limit value"), the output current control circuitry 18 reduces (suppresses or limits) the values of the inverter output currents $i_u$, $i_v$, $i_w$ of the respective phases to an output current value corresponding to the lower limit value $E_{cst}$ of each line voltage. Thus, even if the minimum value $E_{min}$ among the four system voltages ($E_{uvw.max}$, $E_{uv.max}$, $E_{vw.max}$ and $E_{uw.max}$) is, for example 0, it is possible to allow the value of each of the inverter output currents $i_u$, $i_v$, $i_w$ of the respective phases to be an output current value corresponding to the lower limit value $E_{cst}$ of each line voltage, and therefore a stable continuous operation of the power conditioner 1 can be performed.

Further, according to the power conditioner 1 of the present exemplary embodiment, when the minimum value $E_{min}$ among the four maximum voltage values, which are the maximum three-phase instantaneous voltage value (amplitude) $E_{uv.max}$ detected by the instantaneous voltage detection circuitry 19 and the amplitudes (maximum values) $E_{uv.max}$, $E_{vw.max}$ and $E_{uw.max}$ of the three line voltages detected by the average voltage detection circuitry 20, becomes equal to or lower than the threshold $E_{FRT.cst}$, the instantaneous voltage drop detection circuitry 21 detects that an instantaneous voltage drop has occurred in the three-phase system 3. On the other hand, when the minimum value $E_{min}$ changes from a value equal to or lower than the threshold $E_{FRT.cst}$ to a value higher than the threshold $E_{FRT.cst}$ by equal to or more than the predetermined value $\Delta E_{FRT}$, the instantaneous voltage drop detection circuitry 21 detects that the voltage of the three-phase system 3 has recovered to a normal voltage value. This prevents an erroneous operation caused, for example, by noise, and can improve the stability of the output current control of the inverter 5.

Further, according to the power conditioner 1 of the present exemplary embodiment, Third Harmonic Injected PWM method is used to switch the switching elements S1 to S6 of the inverter 5. This makes it possible to remove or cancel third harmonic components in line voltages, and therefore the output voltage utilization rate can be improved. Thus, when controlling a DC bus voltage to be constant in the inverter 5, the use of Third Harmonic Injected PWM method can reduce a command value for the DC bus voltage as compared with the case of using normal SPWM method, thereby making it possible to improve the conversion efficiency of the inverter 5.

Further, according to the present exemplary embodiment described above, the output current control method of the power conditioner 1 comprising the inverter 5 for converting the DC power based on the power input from the solar cell to three-phase AC power comprises the steps of: detecting the maximum three-phase instantaneous voltage value (amplitude) $E_{uvw.max}$ of the three-phase system 3; detecting the maximum values (amplitudes) $E_{uv.max}$, $E_{vw.max}$, $E_{uw.max}$ of the respective three line voltages of the three-phase system 3; detecting an instantaneous voltage drop in the three-phase system 3; and reducing (limiting) the values of the inverter output currents $i_u$, $i_v$, $i_w$, when an instantaneous voltage drop is detected, to an output current value corresponding to a minimum value $E_{min}$ among the four maximum voltage values, which are the detected maximum three-phase instantaneous voltage value (amplitude) $E_{uvw.max}$ and the detected three maximum values (amplitudes) $E_{uv.max}$, $E_{vw.max}$ and $E_{uw.max}$ of the three line voltages. Thus, according to this output current control method, when an instantaneous voltage drop occurs, the inverter output currents $i_u$, $i_v$, $i_w$ can be suppressed (limited) to prevent the occurrence of an overcurrent, making it possible to perform a stable continuous operation of the power conditioner 1, regardless of whether the three-phase system voltage is balanced or unbalanced. Furthermore, there is no risk that an upstream power system may become unstable, since the inverter output currents are suppressed (reduced or limited) when the instantaneous voltage drop is detected.

MODIFIED EXAMPLES

It is to be noted that the present invention is not limited to the above-described exemplary embodiment, and various modifications are possible within the spirit and scope of the present invention. Modified examples of the present invention will be described below.

Modified Example 1

The above-described exemplary embodiment shows an example in which the instantaneous line voltages $e_{uv}$, $e_{vw}$ (three-phase AC voltage) of the three-phase system 3 are converted to the two-phase AC voltages $e_\alpha$, $e_\beta$ of the α-phase and β-phase, and the maximum three-phase instantaneous voltage value $E_{uvw.max}$ is obtained based on the thus obtained two-phase AC voltages $e_\alpha$, $e_\beta$. However, instead, a method to directly measure the three-phase instantaneous voltage can be used to detect the maximum three-phase instantaneous voltage value.

Modified Example 2

According to the above-described exemplary embodiment, when the minimum value $E_{min}$ among the four maximum voltage values, which are the maximum three-phase instantaneous voltage value (amplitude) $E_{uvw.max}$ and the maximum values $E_{uv.max}$, $E_{vw.max}$ and $E_{uw.max}$ of the three line voltages, changes from a value equal to or lower than the threshold $E_{FRT.cst}$ to a value higher than the threshold $E_{FRT.cst}$ by equal to or more than the predetermined value $\Delta E_{FRT}$, the voltage of the three-phase system 3 is detected to have recovered to a normal voltage value, and the mode of the power conditioner 1 is switched from FRT mode to normal operation mode. However, the condition for switching from FRT mode to normal operation mode is not limited thereto, and the power conditioner 1 can be designed so that when the minimum value $E_{min}$ among the four maximum voltage values, which are the maximum three-phase instantaneous voltage value (amplitude) $E_{uvw.max}$ and the maximum values $E_{uv.max}$, $E_{vw.max}$ and $E_{uw.max}$ of the three line voltages, changes from a value equal to or lower than the threshold $E_{FRT.cst}$ to simply a value higher than the threshold $E_{FRT.cst}$, the voltage of the three-phase system 3 is detected to have recovered to a normal voltage value, and the mode of the power conditioner 1 is switched from FRT mode to normal operation mode.

Modified Example 3

The above-described exemplary embodiment shows an example where the grid connection power conversion device of the present invention is the power conditioner 1 to connect the solar cell 2 to the three-phase system 3. However, the grid connection power conversion device to which the present invention is applied is not limited thereto, and can be a power conversion device to connect a distributed power supply such as a wind power generation system and a fuel cell to the three-phase system, and can also be a power conversion device for a hybrid power generation and storage system formed by combining a distributed power supply and a power storage device.

Modified Example 4

The above-described exemplary embodiment shows an example where the control circuitry 7 is formed by a so-called microcomputer. However, the control circuitry 7 is not limited thereto, and can be formed by, for example, a system LSI (Large-Scale Integrated circuit).

Modified Example 5

According to the above-described exemplary embodiment, when an instantaneous voltage drop occurs, Equation (22) is used to obtain the minimum value $E_{min}$ selected from either the preset lower limit value $E_{cst}$ of each line voltage or the minimum value among the four maximum voltage values, which are the three maximum values of the three line voltages and the maximum three-phase instantaneous voltage value. However, as shown in Equations (23) and (24) below, the minimum value $E_{min}$ can also be obtained, without considering the maximum three-phase instantaneous voltage value when the instantaneous voltage drop occurs, by selecting the minimum value $E_{min}$ from either a minimum value among the maximum values of the three line voltages (n=uv, vw, uw) or a preset lower limit value $E_{cst}$ of each line voltage, or by selecting the minimum value $E_{min}$ from either a minimum value among the maximum values of three phase voltages (n=u, v, w) (of the three-phase voltage) or a preset lower limit value $E_{cst}$ of each phase voltage (claimed "phase voltage lower limit value"). The values of the inverter output currents $i_u$, $i_v$, $i_w$ can be limited (reduced) to an output current value corresponding to the thus obtained minimum value $E_{min}$. Then, from the nature of Equations (23) and (24), the time from when the instantaneous voltage drop occurs to when the output current is limited is considered to be one half cycle, when the three-phase system voltage is balanced.

Note, however, that when obtaining the minimum value $E_{min}$ from the minimum value among the maximum values of the three phase voltages and the preset lower limit value $E_{cst}$ of each phase voltage, the effective value $E_{rated}$ of the rated voltage of the line voltage of the three-phase system 3 in Equation (21) above is required to be changed to an effective value of the rated voltage of the phase voltage of the three-phase system 3, and the average voltage detection circuitry 20 in FIG. 2 detects the maximum values of the three phase voltages. The average voltage detection circuitry 20 in this case corresponds to the claimed phase voltage detection circuitry.

The concrete process performed by the output current control circuitry 18 is described below.

In the case where the minimum value $E_{min}$ is selected from either a minimum value among the maximum values of the three line voltages or the preset lower limit value $E_{cst}$ of each line voltage, the output current control circuitry 18 performs the following process.

When the instantaneous voltage drop detection circuitry 21 detects an instantaneous voltage drop in the three-phase system 3, and when a minimum value among the maximum values of the three line voltages detected by the average voltage detection circuitry 20 is equal to or higher than the preset lower limit value $E_{cst}$ of each line voltage, the output current control circuitry 18 reduces the values of the inverter output currents $i_u$, $i_v$, $i_w$ of the respective phases to an output current value corresponding to the minimum value among the maximum values of the three line voltages.

On the other hand, when the instantaneous voltage drop detection circuitry 21 detects an instantaneous voltage drop in the three-phase system 3, and when a minimum value among the maximum values of the three line voltages detected by the average voltage detection circuitry 20 is lower than the preset lower limit value $E_{cst}$ of each line voltage, the output current control circuitry 18 reduces the values of the inverter output currents $i_u$, $i_v$, $i_w$ of the respective phases to an output current value corresponding to the preset lower limit value $E_{cst}$ of each line voltage.

In the case where the minimum value $E_{min}$ is selected from either the minimum value among the maximum values of three phase voltages or the preset lower limit value $E_{cst}$ of each phase voltage, the output current control circuitry 18 performs the following process.

When the instantaneous voltage drop detection circuitry 21 detects an instantaneous voltage drop in the three-phase system 3, and when a minimum value among the maximum values of the three phase voltages detected by the average voltage detection circuitry 20 is equal to or higher than the preset lower limit value $E_{cst}$ of each phase voltage, the output current control circuitry 18 reduces the values of the inverter output currents $i_u$, $i_v$, $i_w$ of the respective phases to an output current value corresponding to the minimum value among the maximum values of the three phase voltages.

On the other hand, when the instantaneous voltage drop detection circuitry 21 detects an instantaneous voltage drop in the three-phase system 3, and when a minimum value among the maximum values of the three phase voltages detected by the average voltage detection circuitry 20 is lower than the preset lower limit value $E_{cst}$ of each phase voltage, the output current control circuitry 18 reduces the values of the inverter output currents $i_u$, $i_v$, $i_w$ of the respective phases to an output current value corresponding to the preset lower limit value $E_{cst}$ of each phase voltage.

$$E_{min} = \max\{\min\{E_{n \cdot max}\}, E_{cst}\} \tag{23}$$

$$E_{n \cdot max} = \sqrt{\frac{4}{T_{Grid \cdot avg}} \cdot \int_0^{\frac{T_{Grid \cdot avg}}{2}} e_n^2(t) dt}, \tag{24}$$

$n = uv, vw, uw$ or $u, v, u$

Modified Example 6

According to the above-described exemplary embodiment, the three instantaneous line voltages $e_{uv}$, $e_{uw}$ and $e_{uw}$ of the three-phase system 3 are measured by the line voltage measurement circuitry 26. When an instantaneous voltage drop occurs, Equation (22) is used to obtain the minimum value $E_{min}$ by selecting from either the preset lower limit value $E_{cst}$ of each line voltage or the minimum value among the four maximum voltage values which are the three maximum values of the three line voltages obtained based on the three line voltages as measured above and the maximum three-phase instantaneous voltage value. Then, the values of the inverter output currents $i_u$, $i_v$, $i_w$ are reduced (limited) to an output current value corresponding to the thus obtained minimum value $E_{min}$. However, the output current control method of the present invention when an instantaneous voltage drop occurs is not limited thereto. For example, it is also possible to measure the instantaneous values of any two line voltages out of the three line voltages, and calculate (compute) the instantaneous value of the third line voltage (that is, the line voltage of the other of the three line voltages) from the instantaneous value of the two measured line voltages, and to limit or suppress the inverter output currents $i_u$, $i_v$, $i_w$ (reduce the values of the inverter output currents $i_u$, $i_v$, $i_w$) to an output current value corresponding to the minimum value $E_{min}$ calculated from Equation (22) or (23) as described below.

Figure 15:
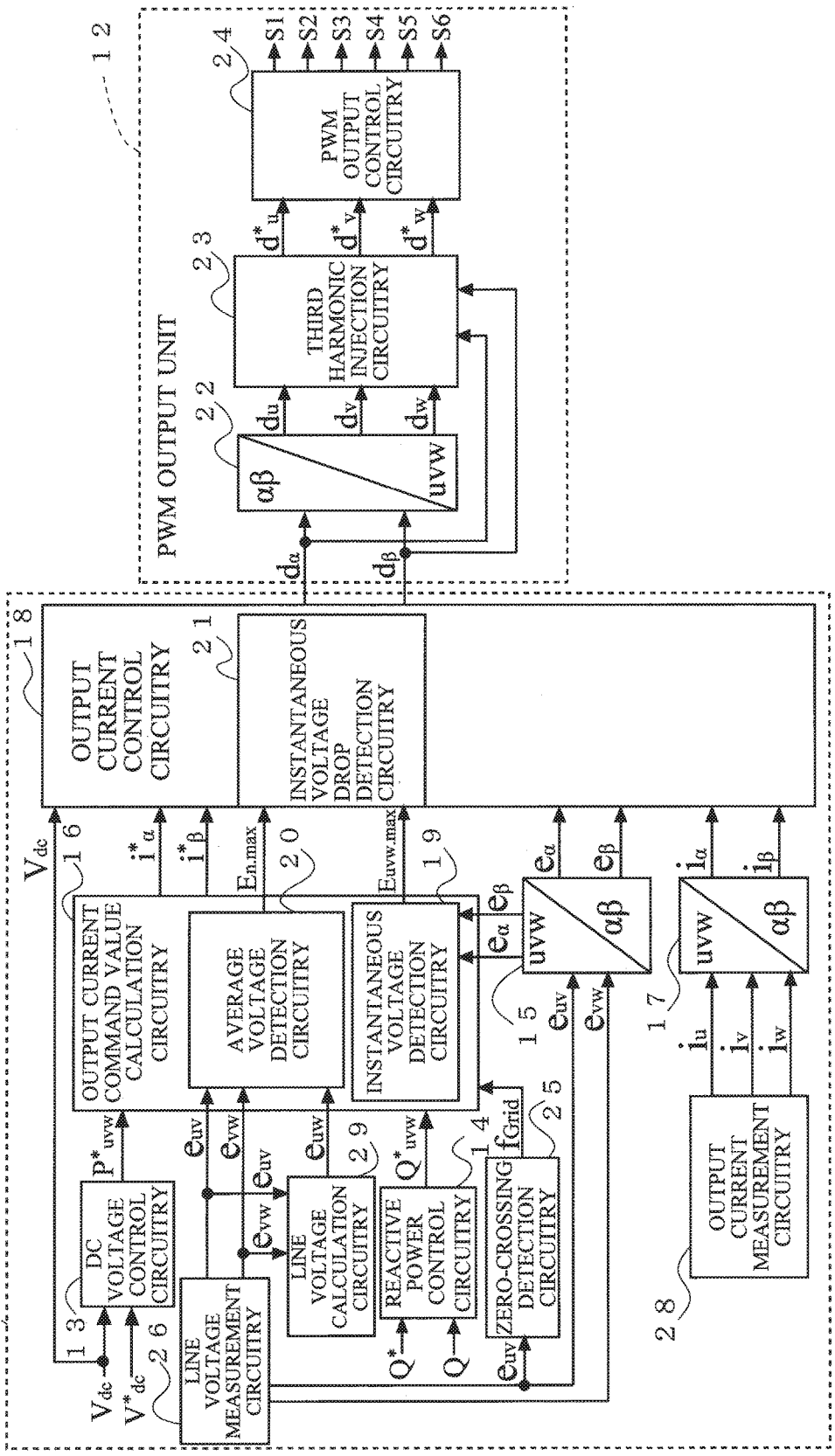
FIG. 15 is a schematic block diagram showing a control circuitry of a power conditioner according to Modified Example 6 of the present invention.

FIG. 15 is a schematic block diagram showing a control circuitry of a power conditioner 1 according to Modified Example 6 of the present invention. More specifically, as shown in FIG. 15, first, the line voltage measurement circuitry 26 is configured to measure the instantaneous line voltage $e_{uv}$ between the U-phase and the V-phase and the instantaneous line voltage $e_{vw}$ between the V-phase and the W-phase among the three instantaneous line voltages $e_{uv}$, $e_{vw}$ and $e_{uw}$. The power conditioner 1 further comprises a line voltage calculation circuitry 29 configured to calculate an instantaneous line voltage $e_{uw}$ (the other or the third instantaneous line voltage) between the U-phase and the W-phase based on the two measured instantaneous line voltages $e_{uv}$, $e_{vw}$ by using Equation (25) below.

Then, based on the two instantaneous line voltages $e_{uv}$, $e_{vw}$ measured by the line voltage measurement circuitry 26 and the instantaneous line voltage $e_{uw}$ calculated by the line voltage calculation circuitry 29, the average voltage detection circuitry 20 obtains or calculates three maximum values $E_{n.max}$ ($E_{uv.max}$, $E_{vw.max}$ and $E_{uw.max}$) of the three line voltages. Then, when an instantaneous voltage drop occurs (in FRT mode), the output current control circuitry 18 substitutes the three maximum values $E_{n.max}$ of the three line voltages obtained by the average voltage detection circuitry 20 into Equation (22) or (23) above, so as to limit or suppress the inverter output currents to an output current value corresponding to either a minimum value among the three maximum values $E_{n.max}$ of the three line voltages, or a minimum value among the four maximum values which are the three maximum values $E_{n.max}$ of the three line voltages and $E_{uvw.max}$ and the maximum three-phase instantaneous voltage value $E_{uvw.max}$.

$$e_{uw} = e_{uv} + e_{vw} \tag{25}$$

Modified Example 7

According to the above-described exemplary embodiment, the three instantaneous line voltages $e_{uv}$, $e_{vw}$ and $e_{uw}$ of the three-phase system 3 are measured by the line voltage measurement circuitry 26, and the three inverter output currents $i_u$, $i_v$, $i_w$ (their instantaneous values) are measured by the output current measurement circuitry 28. However, in order to enable a reduction in the cost of the control circuitry 7 by reducing the number of input ports and the number of function blocks for A/D conversion, the power conditioner 1 can be designed to allow the line voltage measurement circuitry 26 (a voltage sensor) and the output current measurement circuitry 28 (a current sensor) to measure any two of the three instantaneous line voltages and any two of the three inverter output currents (their instantaneous values), respectively, and designed to allow the control circuitry 7 to calculate (compute) the other (third) instantaneous line voltage and the other (third) inverter output current.

More specifically, regarding the instantaneous line voltage, for example, the line voltage measurement circuitry 26 measures the instantaneous line voltage $e_{uv}$ between the U-phase and the V-phase and the instantaneous line voltage $e_{vw}$ between the V-phase and the W-phase among the three instantaneous line voltages $e_{uv}$, $e_{vw}$ and $e_{uw}$, and an instantaneous line voltage $e_{uw}$ between the U-phase and the W-phase is calculated based on the two measured instantaneous line voltages $e_{uv}$, $e_{vw}$ by using Equation (25) above. Further, regarding the inverter output currents, for example, the output current measurement circuitry 28 measures only inverter output currents $i_u$, $i_v$ (their instantaneous values) of the U-phase and the V-phase among the three inverter output currents $i_u$, $i_v$, $i_w$ (their instantaneous values), and then an inverter output current $i_w$ (its instantaneous value) of the W-phase is calculated based on the two measured inverter output currents $i_u$, $i_v$ by using Equation (26) below.

$$i_w = -(i_u + i_v) \tag{26}$$

Modified Example 8

According to the above-described exemplary embodiment, when an instantaneous voltage drop occurs, Equation (21) is used to reduce the two-phase AC output current command values for the inverter 5 to those corresponding to the above minimum value $E_{min}$, so as to limit or suppress the values of the inverter output currents $i_u$, $i_v$, $i_w$ of the respective phases. However, it is also possible, when an instantaneous voltage drop occurs (in FRT mode), to use Equation (27) below to multiply the two-phase AC output current command values $i^*_\alpha$, $i^*_\beta$ for the inverter 5, as obtained by using Equations (1) to (4) above, by a predetermined coefficient y so as to reduce the two-phase AC output current command values $i^*_{\alpha.FRT}$, $i^*_{\beta.FRT}$, thereby limiting or suppressing the inverter output currents $i_u$, $i_v$, $i_w$. Note that the coefficient y in Equation (27) is set in the range of 0 to 1.

$$\begin{cases} \begin{bmatrix} i^*_{\alpha.FRT} \\ i^*_{\beta.FRT} \end{bmatrix} = y \cdot \begin{bmatrix} i^*_\alpha \\ i^*_\beta \end{bmatrix} \\ 0 \leq y < 1 \end{cases} \tag{27}$$

Modified Example 9

According to the above-described exemplary embodiment, the simulations of the power conditioner 1 when an instantaneous voltage drop occurs were performed where the three phases of the power supply of the three phase system 3 are Δ-connected. However, the present invention can also be applied to the case where the three phases of the power supply of the three-phase system 3 are Y-connected.

These and other modifications will become obvious, evident or apparent to those ordinarily skilled in the art, who have read the description. Accordingly, the appended claims should be interpreted to cover all modifications and variations which fall within the spirit and scope of the present invention.

The invention claimed is:

1. A grid connection power conversion device for connecting a distributed power supply to a three-phase commercial power system, the grid connection power conversion device comprising:
    an inverter for converting DC power based on power input from the distributed power supply to three-phase AC power;
    an instantaneous voltage detection circuitry configured to detect a maximum three-phase instantaneous voltage value of the commercial power system;
    a line voltage detection circuitry configured to detect three maximum values of three line voltages of three-phase AC voltage of the commercial power system;
    an instantaneous voltage drop detection circuitry configured to detect an instantaneous voltage drop in the commercial power system; and
    an output current control circuitry configured to control an output current value from the inverter,
    wherein when the instantaneous voltage drop detection circuitry detects an instantaneous voltage drop, the output current control circuitry reduces the output current value from the inverter to an output current value corresponding to a minimum value among four maximum voltage values, the four maximum voltage values are: (i) the maximum three-phase instantaneous voltage value detected by the instantaneous voltage detection circuitry and (ii) the three maximum values of the three line voltages detected by the line voltage detection circuitry.

2. The grid connection power conversion device according to claim 1, further comprising: a three-phase to two-phase AC voltage conversion circuitry configured to convert the three-phase AC voltage of the commercial power system to two-phase AC voltage of α-phase and β-phase,
    wherein the instantaneous voltage detection circuitry obtains the maximum three-phase instantaneous voltage value based on the two-phase AC voltage of the α-phase and the β-phase obtained by conversion by the three-phase to two-phase AC voltage conversion circuitry.

3. The grid connection power conversion device according to claim 2, further comprising:
an active power command value output circuitry configured to output a command value for active power to be output from the inverter;
a reactive power command value output circuitry configured to output a command value for reactive power to be output from the inverter; and
an output current command value calculation circuitry configured to calculate two-phase AC output current command values of the α-phase and the β-phase for two-phase AC current to be output from the inverter based on the active power command value output from the active power command value output circuitry, the reactive power command value output from the reactive power command value output circuitry, and the two-phase AC voltage of the α-phase and the β-phase obtained by conversion by the three-phase to two-phase AC voltage conversion circuitry,
wherein the output current control circuitry controls the output current value from the inverter based on the two-phase AC output current command values of the α-phase and the β-phase calculated by the output current command value calculation circuitry.

4. The grid connection power conversion device according to claim 2,
wherein the line voltage detection circuitry calculates an effective value of each of the three line voltages of the commercial power system for one half period of voltage waveform of the commercial power system, and calculates the three maximum values of the three line voltages by multiplying an effective value of each of the three line voltages by the square root of 2.

5. The grid connection power conversion device according to claim 4,
wherein when the three-phase AC voltage of the commercial power system is unbalanced, the output current control circuitry limits the output current value from the inverter to a predetermined upper limit value during the one half period of the voltage waveform from when the instantaneous voltage drop occurs, and reduces the output current value from the inverter to an output current value corresponding to the minimum value among the four maximum voltage values when the instantaneous voltage drop detection circuitry detects the instantaneous voltage drop.

6. The grid connection power conversion device according to claim 1,
wherein when the instantaneous voltage drop detection circuitry detects the instantaneous voltage drop, and when the minimum value among the four maximum voltage values is lower than a preset line voltage lower limit value, the output current control circuitry reduces the output current value from the inverter to an output current value corresponding to the line voltage lower limit value.

7. The grid connection power conversion device according to claim 1,
wherein the instantaneous voltage drop detection circuitry detects that the instantaneous voltage drop has occurred when the minimum value among the four maximum voltage values becomes equal to or lower than a predetermined threshold, and wherein the instantaneous voltage drop detection circuitry detects that the voltage of the commercial power system has recovered to a normal voltage value when the minimum value among the four maximum voltage values changes from a value equal to or lower than the threshold to a value higher than the threshold by equal to or more than a predetermined value.

8. The grid connection power conversion device according to claim 1,
wherein the inverter comprises switching elements which are switched by Third Harmonic Injected Pulse Width Modulation method.

9. The grid connection power conversion device according to claim 1,
wherein the three phases of the power supply of the commercial power system are Δ-connected or Y-connected.

10. The grid connection power conversion device according to claim 1, further comprising:
a line voltage measurement circuitry configured to measure two instantaneous line voltages among three instantaneous line voltages of the commercial power system; and
a line voltage calculation circuitry configured to calculate the other instantaneous line voltage among the three instantaneous line voltages based on the two instantaneous line voltages measured by the line voltage measurement circuitry,
wherein the line voltage detection circuitry obtains the three maximum values of the three line voltages based on the two instantaneous line voltages measured by the line voltage measurement circuitry and the other instantaneous line voltage calculated by the line voltage calculation circuitry.

11. A grid connection power conversion device for connecting a distributed power supply to a three-phase commercial power system, the grid connection power conversion device comprising:
an inverter for converting DC power based on power input from the distributed power supply to three-phase AC power;
a line voltage detection circuitry configured to detect a maximum value of each of three line voltages of three-phase AC voltage of the commercial power system;
an instantaneous voltage drop detection circuitry configured to detect an instantaneous voltage drop in the commercial power system; and
an output current control circuitry configured to control an output current value from the inverter,
wherein when the instantaneous voltage drop detection circuitry detects an instantaneous voltage drop in the commercial power system, and when a minimum value among the maximum values of the three line voltages detected by the line voltage detection circuitry is equal to or higher than a preset line voltage lower limit value, the output current control circuitry reduces the output current value from the inverter to an output current value corresponding to the minimum value among the maximum values of the three line voltages, and
wherein when the instantaneous voltage drop detection circuitry detects an instantaneous voltage drop in the commercial power system, and when a minimum value among the maximum values of the three line voltages detected by the line voltage detection circuitry is lower than the line voltage lower limit value, the output current control circuitry reduces the output current value from the inverter to an output current value corresponding to the line voltage lower limit value.

12. The grid connection power conversion device according to claim 11, further comprising:
a line voltage measurement circuitry configured to measure two instantaneous line voltages among three instantaneous line voltages of the commercial power system; and
a line voltage calculation circuitry configured to calculate the other instantaneous line voltage among the three instantaneous line voltages based on the two instantaneous line voltages measured by the line voltage measurement circuitry,
wherein the line voltage detection circuitry obtains the maximum values of the three line voltages based on the two instantaneous line voltages measured by the line voltage measurement circuitry and the other instantaneous line voltage calculated by the line voltage calculation circuitry.

13. A grid connection power conversion device for connecting a distributed power supply to a three-phase commercial power system, the grid connection power conversion device comprising:
an inverter for converting DC power based on power input from the distributed power supply to three-phase AC power;
a phase voltage detection circuitry configured to detect a maximum value of each of three phase voltages of three-phase AC voltage of the commercial power system;
an instantaneous voltage drop detection circuitry configured to detect an instantaneous voltage drop in the commercial power system; and
an output current control circuitry configured to control an output current value from the inverter,
wherein when the instantaneous voltage drop detection circuitry detects an instantaneous voltage drop in the commercial power system, and when a minimum value among the maximum values of the three phase voltages detected by the phase voltage detection circuitry is equal to or higher than a preset phase voltage lower limit value, the output current control circuitry reduces the output current value from the inverter to an output current value corresponding to the minimum value among the maximum values of the three phase voltages, and
wherein when the instantaneous voltage drop detection circuitry detects an instantaneous voltage drop in the commercial power system, and when a minimum value among the maximum values of the three phase voltages detected by the phase voltage detection circuitry is lower than the phase voltage lower limit value, the output current control circuitry reduces the output current value from the inverter to an output current value corresponding to the phase voltage lower limit value.

14. An output current control method of a grid connection power conversion device comprising an inverter for converting DC power based on power input from a distributed power supply to three-phase AC power, the output current control method comprising the steps of:
detecting a maximum three-phase instantaneous voltage value of a commercial power system;
detecting three maximum values of three line voltages of the commercial power system;
detecting an instantaneous voltage drop in the commercial power system; and
reducing an output current value from the inverter to an output current value corresponding to a minimum value among four maximum voltage values, the four maximum voltage values are: (i) the maximum three-phase instantaneous voltage value and (ii) the three maximum values of the three line voltages, when the instantaneous voltage drop has been detected.

* * * * *